(12) United States Patent
Ishizaki

(10) Patent No.: US 7,355,741 B2
(45) Date of Patent: Apr. 8, 2008

(54) DATA PROCESSING APPARATUS FOR CONDENSED PRINTING

(75) Inventor: Koji Ishizaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 690 days.

(21) Appl. No.: 10/316,470

(22) Filed: Dec. 10, 2002

(65) Prior Publication Data

US 2003/0107767 A1 Jun. 12, 2003

(30) Foreign Application Priority Data

Dec. 11, 2001 (JP) ............................. 2001-377710

(51) Int. Cl.
*B41J 1/00* (2006.01)
*G06F 15/00* (2006.01)
*B41F 1/00* (2006.01)

(52) U.S. Cl. ................. 358/1.18; 358/1.2; 358/1.9; 358/1.11; 382/305; 382/306; 382/165

(58) Field of Classification Search ............... 382/305, 382/306; 358/1.18, 1.2, 1.9, 1.11
See application file for complete search history.

(56) References Cited

U.S. PATENT DOCUMENTS 5,950,045 A * 9/1999 Nomura et al. ............. 399/81
6,185,333 B1 * 2/2001 Arai et al. ................ 382/187
6,188,490 B1 * 2/2001 Miyake .................... 358/1.18
6,301,013 B1 * 10/2001 Momose et al. .......... 358/1.15
6,473,196 B2 * 10/2002 Usami et al. ............. 358/1.18
6,690,843 B1 * 2/2004 Squilla et al. ............. 382/306
6,847,466 B1 * 1/2005 Gazdik et al. ............ 358/1.15
6,894,804 B2 * 5/2005 Nguyen et al. ............. 358/1.2

FOREIGN PATENT DOCUMENTS

EP 1 098 266 A2 5/2001

* cited by examiner

*Primary Examiner*—Twyler Lamb Haskins
*Assistant Examiner*—Benjamin Dulaney
(74) *Attorney, Agent, or Firm*—Panitch Schwarze Belisario & Nadel LLP

(57) ABSTRACT

When multiple pages of a document are condensed and printed on a single sheet of printing media, an image data generator condenses the page image data by a prescribed reduction ratio. A sequence information overlayer overlays layout sequence information such as numerals or arrows, or borders or shading of different densities or colors, on the condensed image data. A recording device prints the condensed image data and overlaid sequence information on the single sheet of printing media. The reader of the condensed document recognizes the condensed page sequence from the overlaid sequence information, and can therefore always tell which page to read next. A print sample image of the single sheet preferably includes a sequence line graphically illustrating the page layout sequence.

20 Claims, 28 Drawing Sheets

FIG. 11

| | | |
|---|---|---|
| 0 | NONE | |
| 1 | UP | ↑ |
| 2 | DOWN | ↓ |
| 3 | RIGHT | → |
| 4 | LEFT | ← |
| 5 | RIGHTDOWN | ↘ |
| 6 | LEFTDOWN | ↙ |
| 7 | RIGHTUP | ↗ |
| 8 | LEFTUP | ↖ |

DATA PROCESSING APPARATUS FOR CONDENSED PRINTING

BACKGROUND OF THE INVENTION

1. Field of the Invention

The present invention relates generally to data processing apparatus, and more specifically to a system for printing multiple pages of a document on a single sheet of paper or other printing media.

2. Description of the Related Art

When a document having a plurality of pages is printed, each page is normally printed on a separate sheet of printing media. It is sometimes useful, however, to condense the pages and print multiple pages on a single sheet. Legal transcripts, for example, are often condensed and printed in this way. Some printers have built-in functions for condensed printing, as does some computer software for creating or editing documents. In some cases, the condensed printing function allows the user to select the layout sequence of the condensed pages on the single sheet.

A problem that arises is that the reader of a condensed document may not know what page layout sequence has been selected, and thus may not know in what order to read the condensed pages. The reader must then try to determine the page order from the content of the condensed pages, which makes reading the document a troublesome task. This problem can occur even when the pages are numbered, because the page numbers are reduced in size and may not be easily legible.

Another problem is that the person who creates or prints the condensed document cannot visually confirm that the condensed pages have been laid out in the intended sequence until the condensed document has been printed. If the pages are not laid out in the intended sequence, then the person must change the layout specification and print the document again, which is wasteful of both time and printing media.

SUMMARY OF THE INVENTION

An object of the present invention is to provide a data processing apparatus that simplifies the reading of a printed document in which a plurality of document pages are printed on a single sheet of printing media.

Another object of the invention is to enable the layout sequence of the pages on the printing media to be confirmed visually before the document is printed.

The invention provides a data processing apparatus having an image data generator for condensing page image data by a prescribed reduction ratio, a layout sequence information processing means for overlaying layout sequence information indicating the condensed page sequence on the condensed image data, and a recording device for printing the condensed image data and overlaid sequence information on a single sheet of printing media. The sequence information may include, for example, overlaid numerals, overlaid arrows or other symbols, page borders of different densities, or shading of different densities.

The reader of a condensed document printed by the invented data processing apparatus can quickly recognize the page sequence from the obvious visual cues provided by the overlaid sequence information, without having to try discover the page sequence from the page content, and without having to search for possibly illegible or nonexistent page numbers.

The invention also provides

BRIEF DESCRIPTION OF THE DRAWINGS

In the attached drawings:

FIG. 11 shows how arrow symbols are designated in the sequence symbol table in FIG. 8;

DETAILED DESCRIPTION OF THE INVENTION

Figure 1:
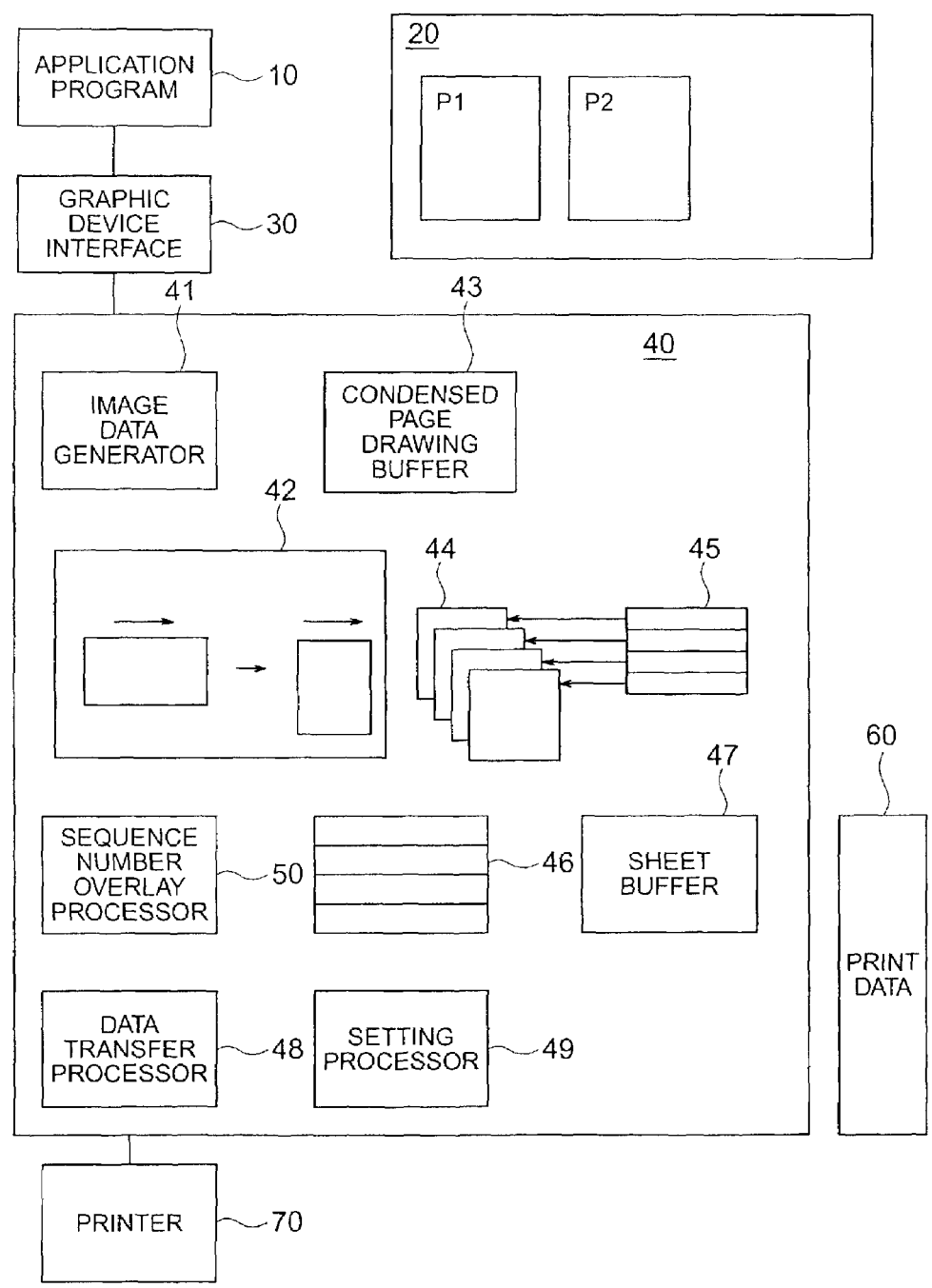
FIG. 1 is a block diagram of a data processing apparatus illustrating a first embodiment of the invention.

Embodiments of the invention will now be described with reference to the attached drawings, in which like elements are indicated by like reference characters.

A block diagram of a data processing apparatus according to a first embodiment of the invention is shown in FIG. 1. The condensed printing function in this embodiment is provided in a printer driver included in the software of a host device such as a computer. In condensed printing, pages are laid out on a single sheet of printing media in X columns and Y rows, where X and Y are positive integers. A total of Z pages are printed on each sheet. In the description below, X and Y will both be three, and Z will be nine.

Figure 2:
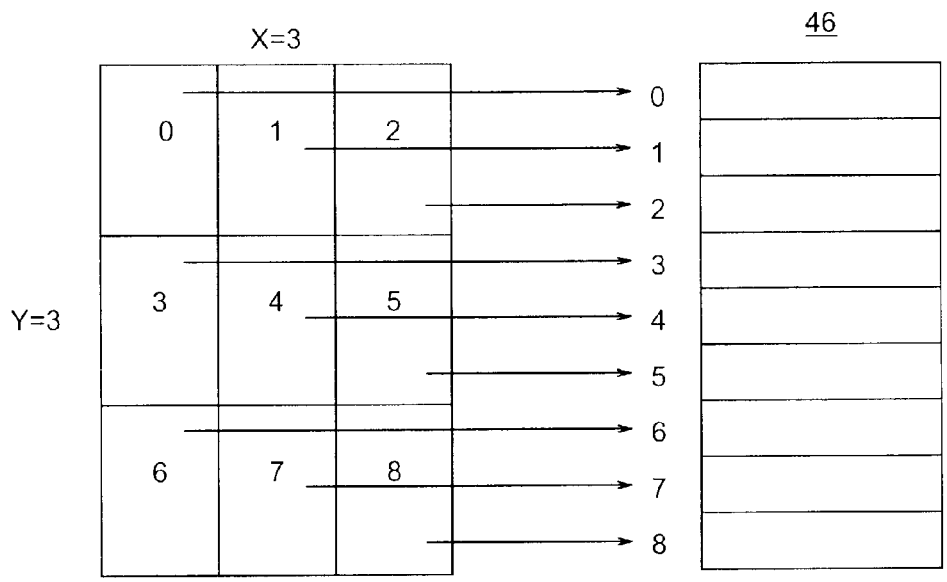
FIG. 2 is a diagram showing how the layout information table in FIG. 1 is indexed by absolute page position.
Figure 3:
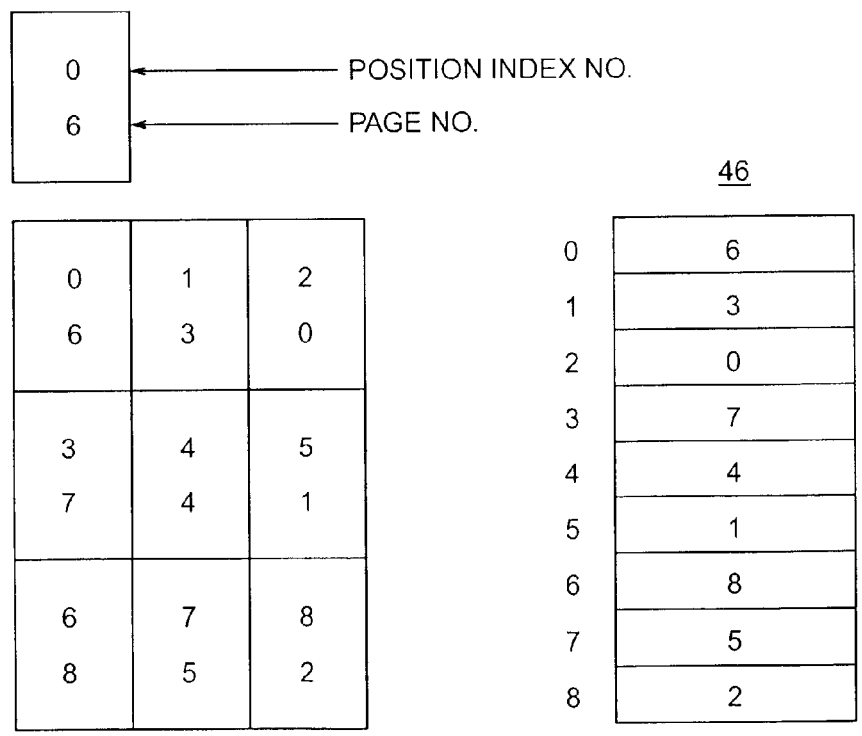
FIG. 3 illustrates a page layout sequence specified by relative sequence numbers in the layout information table.

The page layout is controlled by a layout information table in the printer driver. Absolute page positions are indexed as shown in FIG. 2. Relative sequence numbers are entered in the layout information table to determine the page layout sequence as shown in FIG. 3. In the first embodiment, numerals corresponding to the relative page numbers are overlaid on the condensed pages.

As shown in FIG. 1, the software installed in the host device includes an application program 10 that generates a document 20 comprising pages P1, P2, . . . . To print the document 20, the application program 10 generates graphic drawing data in a form that is independent of the output device. A graphic device interface 30, which is another part of the software of the host device, converts the graphic drawing data to graphic commands suited for the output device, which in this case is a printer 70, and supplies the converted data to the printer driver 40. The printer driver 40 uses the converted data to generate print data 60, and sends the print data 60 to the printer 70. The printer 70 prints the received print data 60. The printer 70 itself does not have a condensed printing function.

The printer driver 40 includes an image data generator 41 that generates image data according to the graphic commands received from the graphic device interface 30, a landscape converter 42 that converts pages from the landscape or wide format to the portrait or tall format, a condensed page drawing buffer 43, a condensed page storage buffer 44, a pointer table 45, the layout information table 46, a sheet buffer 47, a sequence number overlay processor 50 that overlays numerals indicating the page layout sequence on the page image data, a data transfer processor 48 that sends the print data 60 to the printer 70, and a setting processor 49. The user of the host device interacts with the setting processor 49 to select condensed printing conditions, including the number of pages per sheet (Z) and the layout of the pages.

When a plurality of pages are condensed for printing on a single sheet of printing media, image data for all of the pages must be generated in the portrait format, regardless of whether the pages themselves are oriented in the portrait format or landscape format. Accordingly, if any of the pages are oriented in the landscape format, the landscape converter 42 converts their image data to the portrait format before storing the image data in the condensed page storage buffer 44.

The condensed page storage buffer 44 has space for storing Z condensed pages. The pointer table 45 stores pointers corresponding to the relative sequence numbers of the condensed pages to be printed, the pointers indicating the areas in the condensed page storage buffer 44 where the pages are stored. The layout information table 46 indicates where each condensed page is to printed on the sheet of printing media, according to the scheme shown in FIGS. 2 and 3. In these figures, absolute position on the sheet is indicated by index numbers from zero to eight, and the relative sequence numbers also run from zero to eight. In FIG. 3, the upper number on each condensed page is the absolute position index and the lower number is the relative sequence number. The page with relative sequence number zero, for example, is printed in position number two, in the upper right corner of the sheet; the next page, with relative sequence number one, is printed in position number five, just below.

Next, the operation of the first embodiment will be described.

When the document 20 created by the application program 10 is printed by the printer 70, the application program 10 first divides the document 20 into pages, invokes the graphic device interface 30, and draws the lines, text, and so on to be printed on each page as graphic data in a format independent of the output device. The application program 10 takes no cognizance of the fact that Z pages will be printed on a single sheet. The graphic device interface 30 converts the resulting graphic drawing data to a format suited for the printer 70, and invokes the printer driver 40 to have the document 20 printed.

Figure 4A:
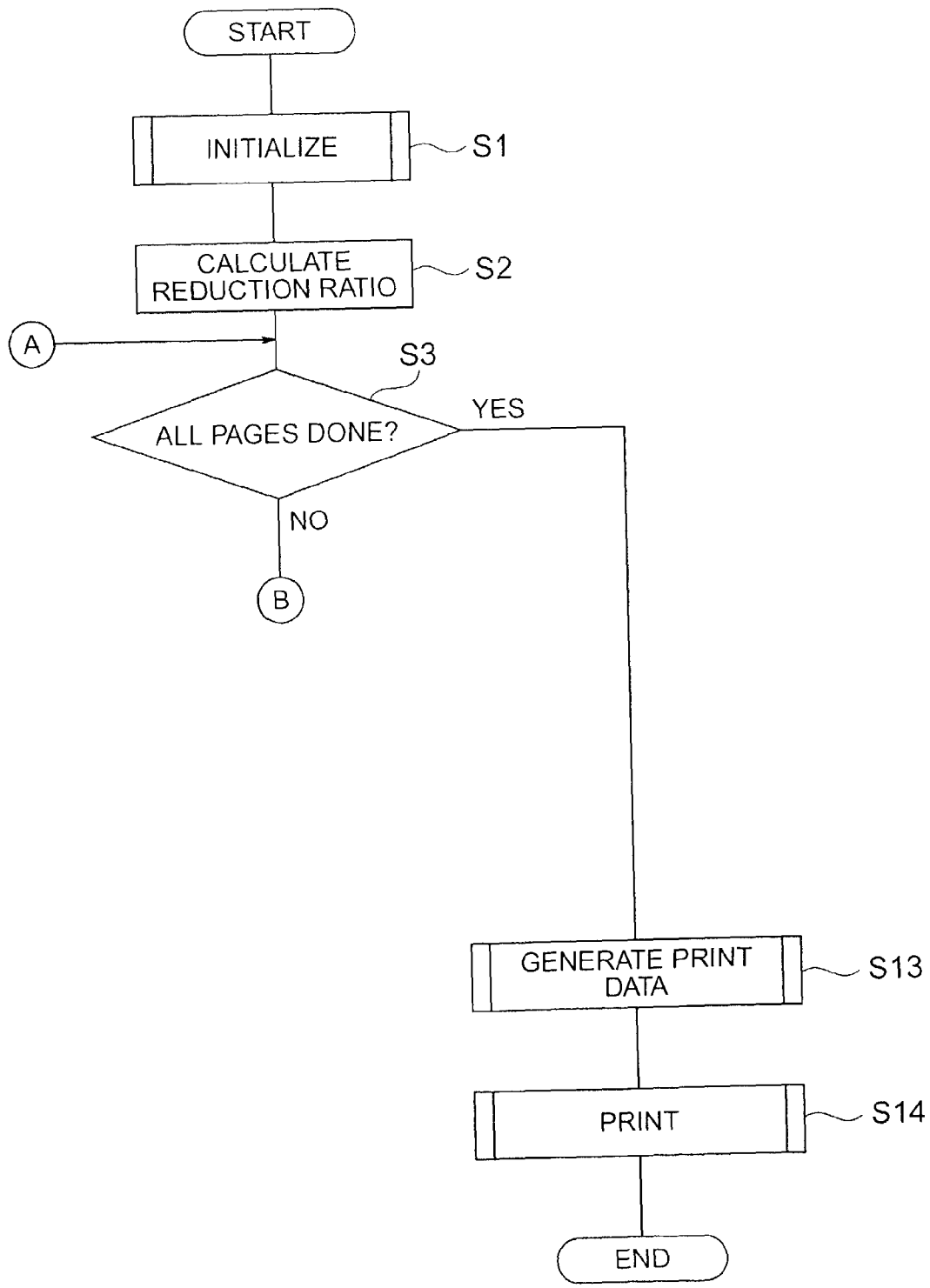
FIGS. 4A and 4B are a flowchart illustrating the operation of the first embodiment.
Figure 4B:
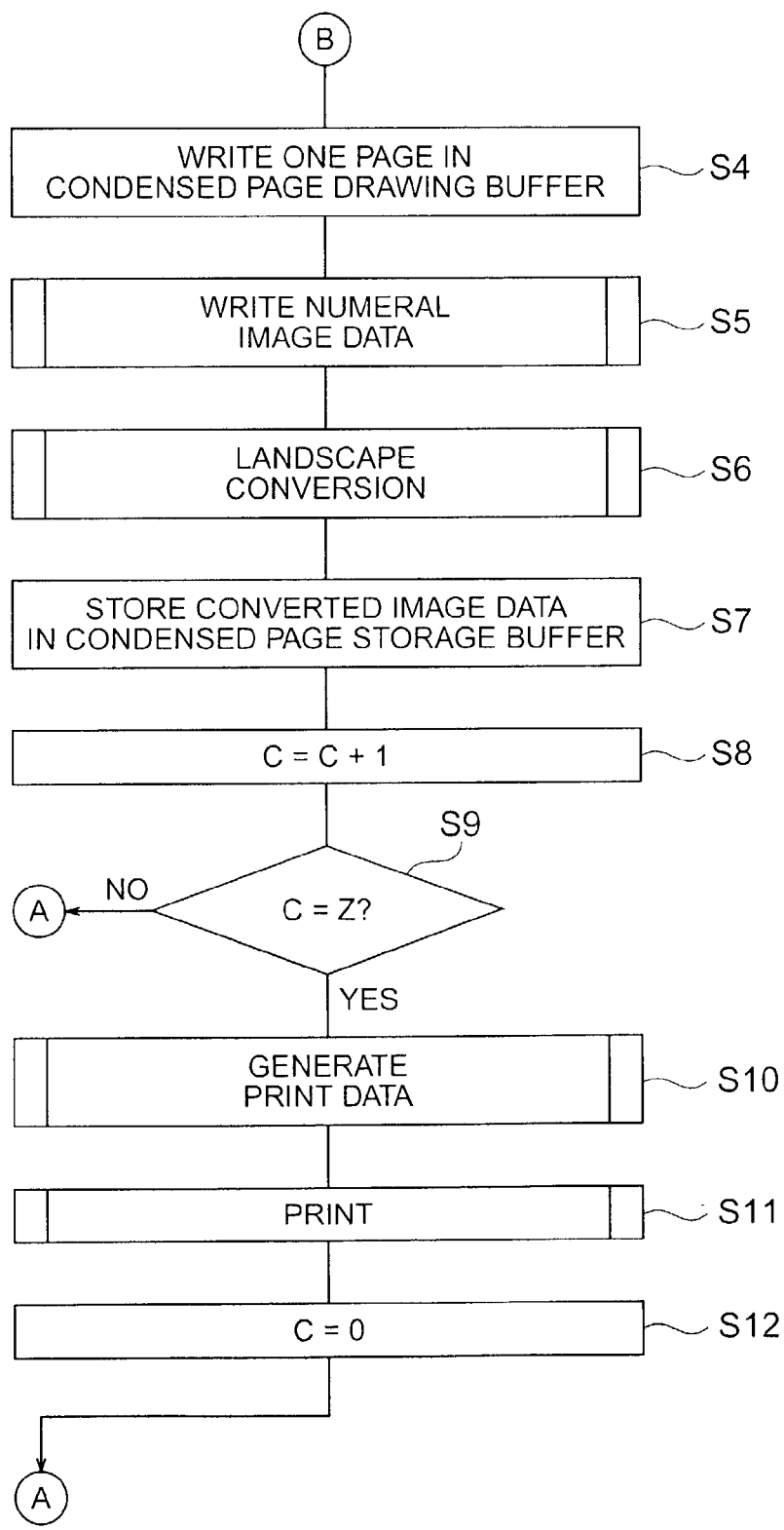

The operation of the printer driver 40 is illustrated in the flowchart in FIGS. 4A and 4B.

When the process of printing one sheet of printing media starts, an initialization module, not shown in FIG. 1, initializes the printer driver 40 by reserving memory space for the buffers, setting pointers, clearing the buffers, clearing various counters etc., calculating the relative sequence numbers of the pages to be printed in each absolute position on the sheet, and writing these numbers in the layout information table 46 (step S1 in FIG. 4A). An absolute position index i can be described in terms of a row and column on the sheet. The row and column (COL) are calculated by dividing the index i by the number of pages per row (X) and finding the integer quotient and integer remainder.

ROW=(quotient of $i/X$)+1

COL=(remainder of $i/X$)+1

For the condensed page layout in FIG. 3, which starts in the top right corner, proceeds down the rightmost column, then proceeds down successive columns to the left, ending in the bottom left corner, the relative sequence number p of the page to be printed in a given row and column is calculated as follows.

$p=\{(X-COL) \cdot Y\}+ROW-1$

For a layout starting in the top left corner, proceeding across the top row, then proceeding from left to right across successively lower rows, the relative sequence number p is calculated as follows:

$p=\{(ROW-1) \times X\}+COL-1$

For a layout starting in the top left corner, proceeding down the leftmost column, then proceeding down successive columns to the right, the relative sequence number p is calculated as follows:

$p=\{(COL-1) \times Y\}+ROW-1$

For a layout starting in the top right corner, proceeding to the left across the top row, then proceeding from right to left across successively lower rows, the relative sequence number p is calculated as follows:

$p=\{(ROW-1) \times X\}+X-(COL-1)$

The layout is selected by interaction between the user and the setting processor 49, as mentioned above.

Next, the printer driver 40 calculates the reduction ratio n for generating condensed image data of the pages (step S2). The value of n depends on the size of the printing media; this size may be specified as control data in the document 20, or may be specified separately by the user. As one example, if two pages are to be printed side by side (X=2, Y=1) on a single sheet of a size originally intended for one page, and if each original page has height h and width w (where w<h), then $$n = w/h$$

Next, the printer driver 40 decides if it has finished processing all pages of the document 20 (step S3 in FIG. 4B). If all pages have not been finished, the image data generator 41 reads the graphic commands for the next page, generates condensed page image data with a reduction ratio of n, and writes the condensed page image data in the condensed page drawing buffer 43 (step S4). A detailed description of this process will be omitted. Next, the sequence number overlay processor 50 generates numeral image data, the numeral or numerals indicating the position of the page in the page layout sequence, and writes the numeral image data in the condensed page drawing buffer 43, overlaying the numeral image data on the condensed page image data (step S5) This process will be described in more detail later.

If the page being processed has the landscape orientation, the landscape converter 42 now converts the image data in the condensed page drawing buffer 43 to the portrait orientation (step S6), and stores the converted image data in the condensed page storage buffer 44 (step S7). If the page being processed had the portrait orientation to begin with, then in steps S6 and S7, the landscape converter 42 simply copies the image data from the condensed page drawing buffer 43 to the condensed page storage buffer 44. The image data are stored in the condensed page storage buffer 44 at a location indicated by a pointer in the pointer table 45.

The pointer table 45 is indexed by a condensed page count (C) that indicates the number of pages of image data that have been stored in the condensed page storage buffer 44 so far for printing on the current sheet. After the image data of the current page have been stored in the condensed page storage buffer 44, the condensed page count C is incremented (step S8).

Next, the printer driver 40 compares the condensed page count C with the value of Z to decide whether it has processed all pages that will fit on the current sheet (step S9). If not (if C is still less than Z), the processing returns to step S3 in FIG. 4A to decide whether the document 20 has another page to be processed. The loop from step S3 to step S9 is repeated until either all pages of the document 20 have been processed, or the Z pages that will fit on the current sheet have been processed.

If the condensed page count C is equal to Z, the printer driver 40 generates print data for the current sheet (step S10). In this process, the printer driver 40 refers to the pointer table 45 and layout information table 46 to lay out the condensed pages stored in the condensed page storage buffer 44 in appropriate positions in the sheet buffer 47, then converts the laid-out page image data stored in the sheet buffer 47 to print data 60. This process will be described in more detail later.

After generating print data 60 for the current sheet, the printer driver 40 sends the print data 60 to the printer 70 together with other necessary signals and commands, and the printer 70 prints Z condensed pages on one sheet of printing media (step S11). Next, the printer driver 40 clears the condensed page count C (step S12) and returns to step S3 in FIG. 4A to decide if the document 20 has more pages to be processed.

When it is determined in step S3 in FIG. 4A that all pages of the document 20 have been processed, the printer driver 40 generates print data 60 for any condensed pages that remain to be printed (step S13), and sends the print data to the printer 70, which prints the remaining pages on a single sheet of printing media (step S14). These steps are carried out in substantially the same way as steps S11 and S12, but since the number of condensed pages remaining to be printed is less than Z, when the content of the sheet buffer 47 is converted to print data 60, null data are generated for the missing pages. The printing of the remaining condensed pages completes the printing of the document 20.

If there are no remaining pages to be printed, (i.e., if the condensed page count C is zero), steps S13 and S14 are skipped.

Figure 5:
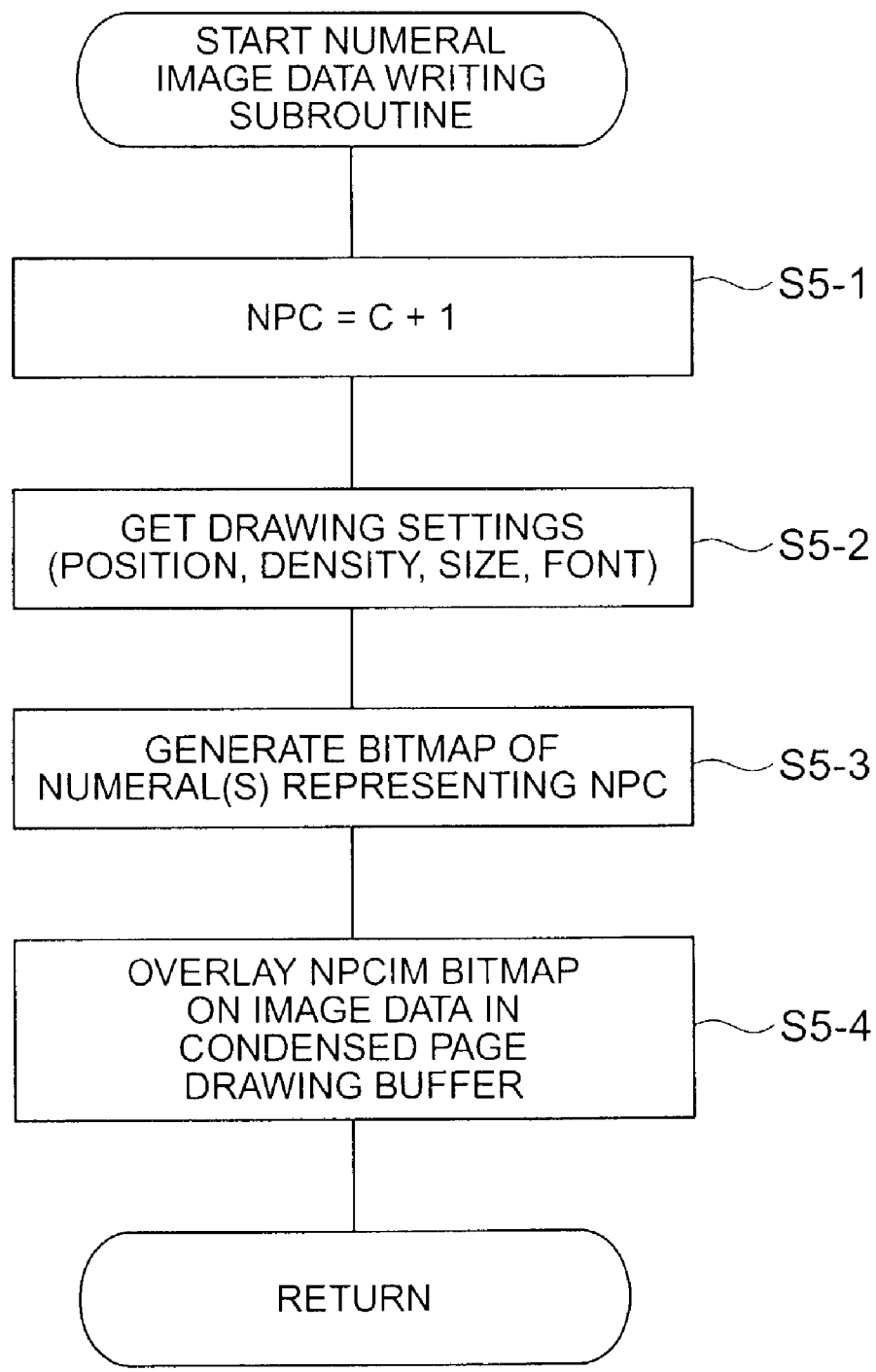
FIG. 5 is a flowchart illustrating step S5 in FIG. 4B.

Next, the process of generating numeral image data will be described with reference to the flowchart in FIG. 5. This process is executed by the printer driver 40 as a subroutine.

When the sequence number overlay processor 50 is invoked in step S5 in FIG. 4B, the condensed page count C has a value from zero to Z−1. The sequence number overlay processor 50 adds one to C to obtain a sequence number NPC (step S5-1 in FIG. 5). Next, the sequence number overlay processor 50 refers to settings supplied by the setting processor 49 to decide how to draw a corresponding numeral or numerals in the condensed page drawing buffer 43 (step S5-2). These settings include, for example, the position (given by coordinates NPCX, NPCY) at which the numeral or numerals should be drawn, the drawing density NPCD, and the numeral size NPCS and font NPCF. On the basis of the NPCD, NPCS, and NPCF settings, the sequence number overlay processor 50 generates bit-mapped image data NPCIM for the numeral or numerals representing the value of the sequence number NPC (step S5-3). Finally, the sequence number overlay processor 50 uses logical OR processing to overlay the bit-mapped image data NPCIM on the image data stored in the condensed page drawing buffer 43 at the position indicated by coordinates NPCX and NPCY (step S5-4). This step is followed by a return to the main processing routine in FIG. 4B.

Figure 6:
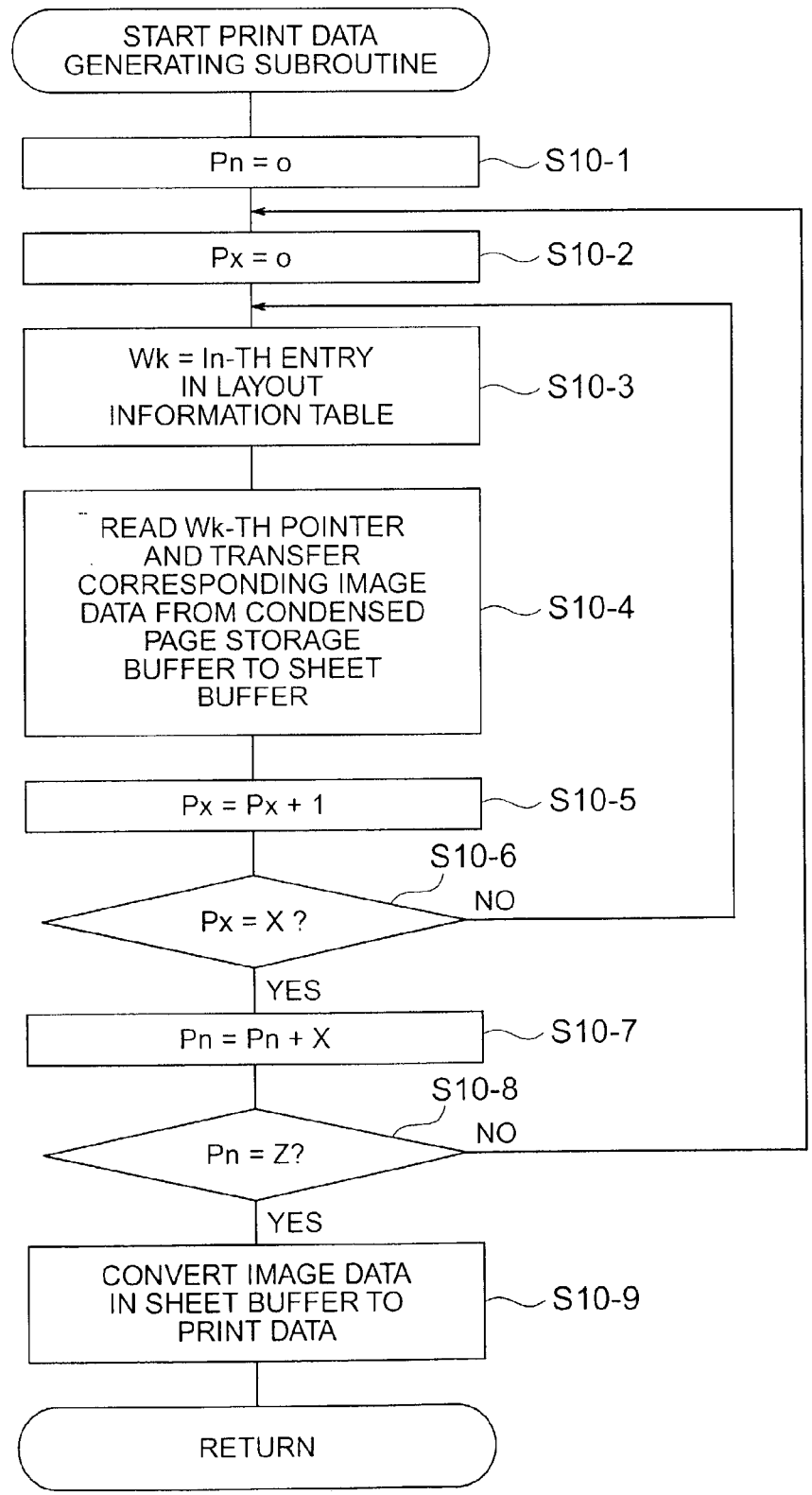
FIG. 6 is a flowchart illustrating step S10 in FIG. 4B.

Next, the process of generating print data will be described with reference to the flowchart in FIG. 6. This process is executed by the printer driver 40 as a subroutine in both steps S10 and S13 in FIGS. 4A and 4B, but for simplicity, the description will be confined to the case in step S10 in which print data for which Z condensed pages are generated.

During this process, the printer driver 40 processes pages in the order of the absolute position index i shown in FIGS. 2 and 3. Instead of using the absolute position index i directly, the printer driver 40 maintains an absolute position count Pn that remains constant in each row, and an absolute column count Px that remains constant in each column. The absolute position index, now denoted In, is equal to the sum of these counts (In=Pn+Px).

First, the absolute position count Pn is cleared (step S10-1 in FIG. 6), and the absolute column count Px is cleared (step S10-2).

Next, the printer driver 40 reads the In-th entry in the layout information table 46 to find the relative sequence number Wk of the page to be printed in the position represented by Pn and Px (step S10-3). This relative sequence number Wk is equal to the value possessed by the condensed page count C when the page was being processed in steps S4 to S7 in FIG. 4B.

Next, the printer driver 40 uses this page number Wk as an index to the pointer table 45, reads the pointer from the pointer table 45 indicating the location of the corresponding condensed page image data in the condensed page storage buffer 44, reads the corresponding condensed page image data from the condensed page storage buffer 44, and stores the page image data thus read in the sheet buffer 47 at a position indicated by Pn and Px (step S10-4).

Next, the absolute column count Px is incremented (step S10-5) and compared with X (step S10-6), X being the number of pages to be printed in each row on the sheet. If Px is less than X, the process returns to step S10-3 to get the image data for the next page in the same row.

If Px is equal to X, indicating that the image data for all pages in the current row have been read, then the value of X (e.g., three) is added to the absolute position count Pn (step S10-7), and Pn is compared with the number of pages per sheet Z (step S10-8). If Pn is less than Z, the process returns to step S10-2 to clear the absolute column count Px and process the next row of condensed pages. If Pn is equal to Z, then all rows have been processed, and the printer driver 40 converts the image data in the sheet buffer 47 to print data 60 (step S10-9). This step is followed by a return to the main processing routine in FIG. 4B.

Figure 7:
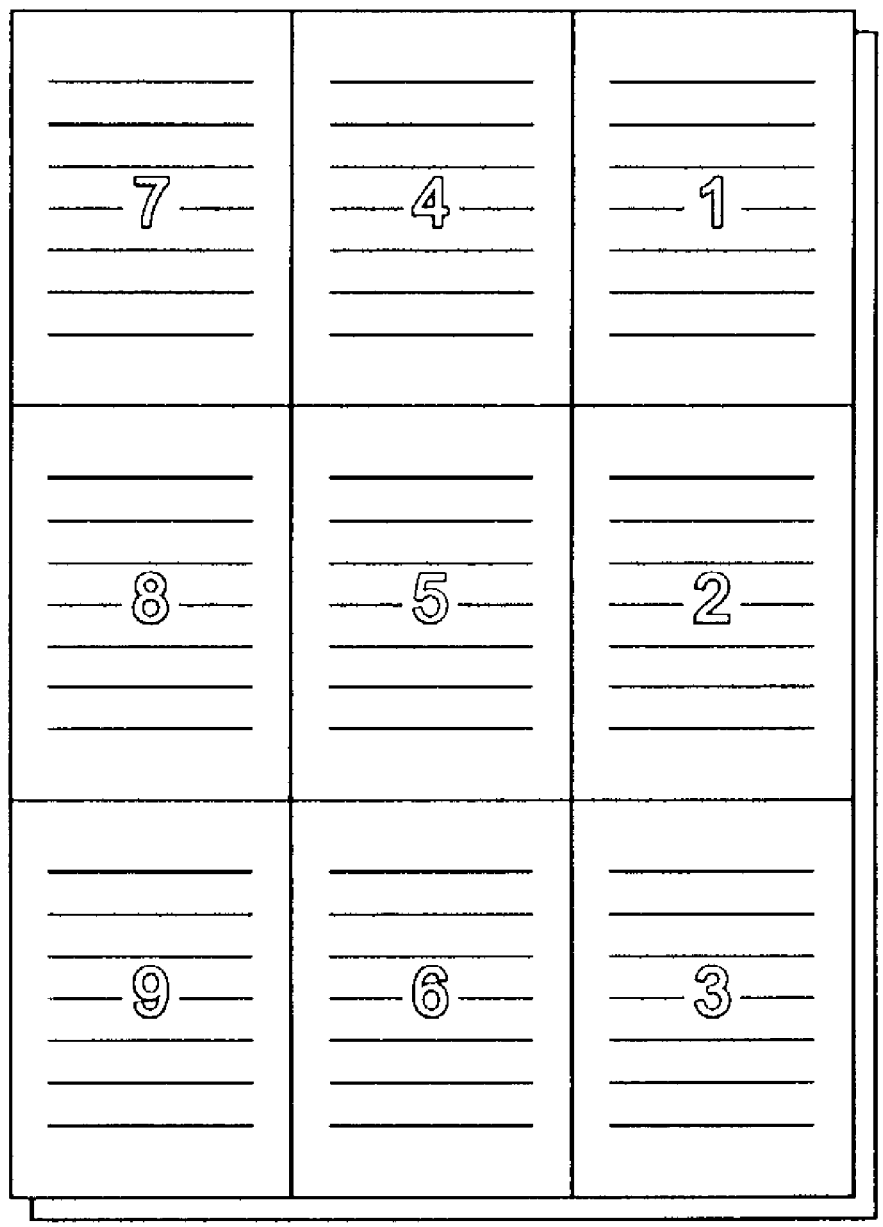
FIG. 7 illustrates condensed pages and overlaid sequence information printed in the first embodiment.

FIG. 7 shows nine condensed pages printed on a single sheet according to the first embodiment. Numerals from one to nine are overlaid on the condensed pages, at or near the centers of the pages in this example, to indicate the order in which the pages should be read. The size of the numerals makes their meaning obvious; a reader of the condensed document 20 will immediately know to start reading from the top right condensed page and proceed down each column before moving on to the next column to the left. Following these large numerals is much easier than hunting for page numbers that may be hard to find, difficult to read, or not even present.

The settings NPCX, NPCY, NPCS, NPCF, and NPCD should be made in such a way that the overlaid numerals do not obscure the printed content of the condensed pages. For example, an outline font (NPCF) may be used, as shown in FIG. 7. Alternatively, a light drawing density (NPCD) may be used, so that the printed content can still be seen through the overlaid numerals, or the overlaid numerals may be sized (NPCS) and positioned (NPCX, NPCY) so that they fit within margin areas on the condensed pages. Although the setting processor 49 may provide default values for the NPCX, NPCY, NPCS, NPCF, and NPCD settings, these settings are preferably alterable by the user, so that if the default settings interfere with the reading of the condensed document, the user can select different settings.

In a second embodiment of the invention, the layout of condensed pages on a sheet of printing media is indicated by the orientation of sequence symbols.

Figure 8:
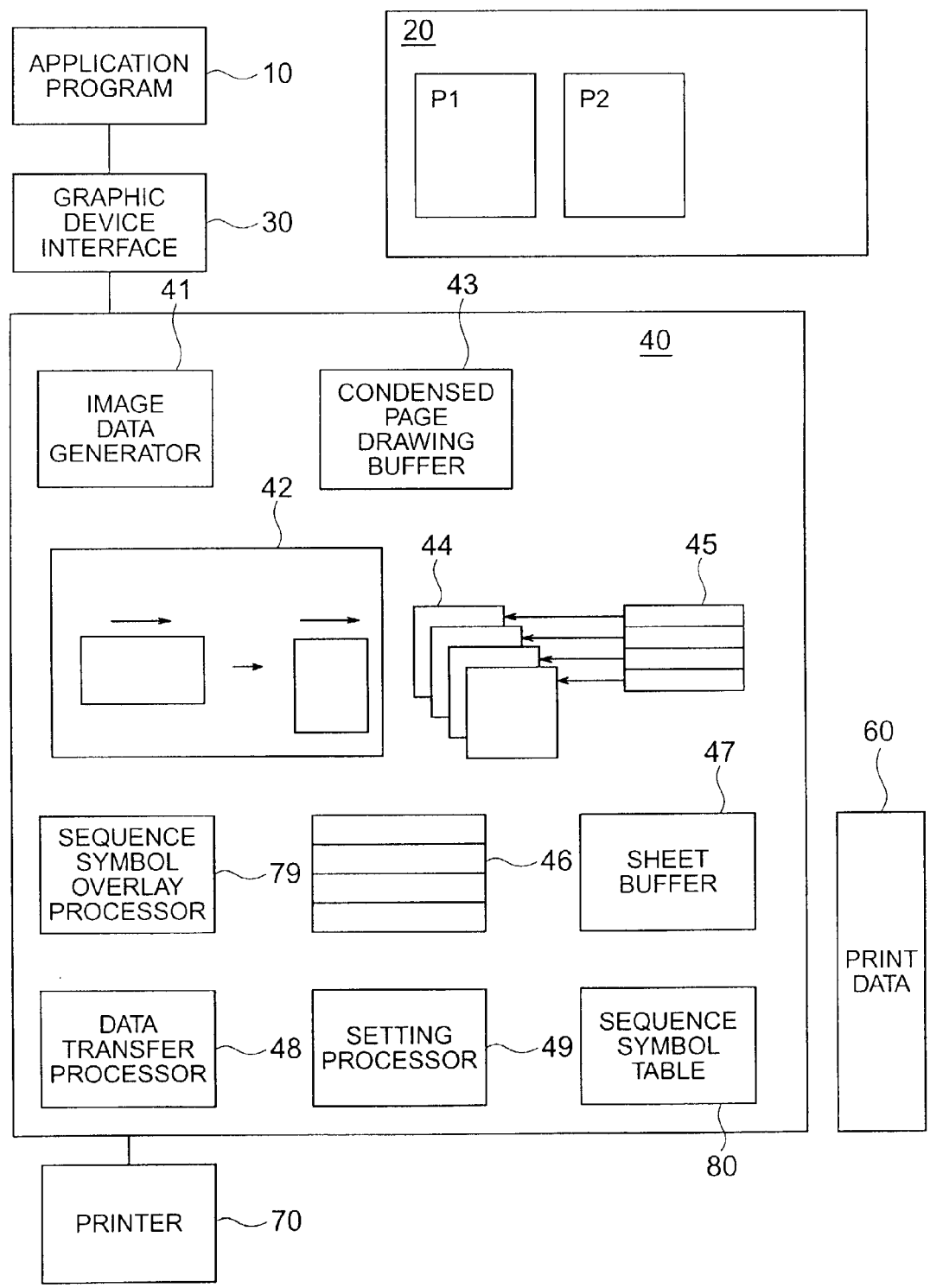
FIG. 8 is a block diagram of a data processing apparatus illustrating a second embodiment of the invention.

Referring to FIG. 8, the second embodiment uses the same application program 10, graphic device interface 30, and printer 70 as in the first embodiment. The printer driver 40 in the second embodiment has substantially the same structure as in the first embodiment, but the sequence number overlay processor is replaced by a sequence symbol overlay processor 79, and a sequence symbol table 80 is added.

Figure 9:
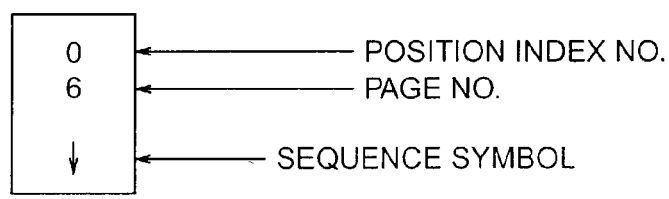
FIG. 9 illustrates a page layout sequence specified by relative sequence numbers and arrow symbols in the second embodiment.

Referring to FIG. 9, the second embodiment will be described by using the same condensed page layout as in the first embodiment. The upper numerals in FIG. 9 are absolute position index values; the lower numerals are relative sequence numbers, equal to values of the condensed page count C. FIG. 9 also shows the sequence symbols used to indicate the page layout.

Figure 10:
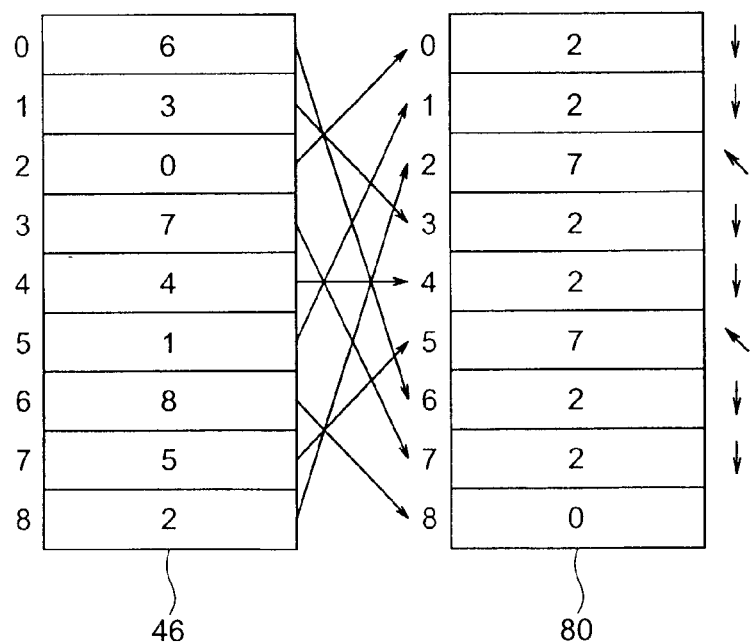
FIG. 10 illustrates the content of the layout information table and sequence symbol table in FIG. 8 for the page layout in FIG. 9.

FIG. 10 shows the content of the layout information table 46 and sequence symbol table 80. The layout information table 46 has the same content as in the first embodiment. The sequence symbol table 80 is indexed by the relative sequence numbers stored in the layout information table 46, thus by the condensed page count C. For each condensed page count, the sequence symbol table 80 stores an integer from one to eight identifying one of eight possible sequence symbol orientations, or the integer zero, indicating the absence of a sequence symbol. As shown to the right of the sequence symbol table 80, the integer two identifies an arrow pointing down, and the integer seven identifies an arrow pointing diagonally up and to the left. A complete list of the sequence symbol orientations indicated by the integers from zero to eight is shown in FIG. 11.

Next, the operation of the printer driver 40 in the second embodiment will be described with reference to the flowchart in FIGS. 12A and 12B.

The initialization process (step S21 in FIG. 12A) is generally similar to the initialization process in the first embodiment, but also includes initialization of the sequence symbol table 80. The initialization of the sequence symbol table 80 will be described in more detail later.

Next, the reduction ratio n is calculated (step S22), and the printer driver 40 decides if all pages of the document 20 have been processed (step S23). If not, condensed page image data with a reduction ratio of n are generated for the next page and written in the condensed page drawing buffer 43 (step S24 in FIG. 12B). These steps S22-S24 are identical to the corresponding steps S2-S4 in the first embodiment.

The sequence symbol overlay processor 79 now draws a sequence symbol in the condensed page drawing buffer 43, overlaying the sequence symbol on the condensed page image data (step S25). This process will be described in more detail later.

If necessary, the landscape converter 42 converts the image data in the condensed page drawing buffer 43 to the portrait orientation (step S26). Then the image data are stored in the condensed page storage buffer 44 (step S27), and the condensed page count C is incremented (step S28) and compared with the value of Z (step S29). If the condensed page count C is still less than Z, the processing returns to step S23 in FIG. 12A; otherwise, the printer driver 40 generates print data (step S30), the printer 70 prints Z condensed pages on a single printing media sheet (step S31), the condensed page count C is cleared (step S32), and the process returns to step S23.

When it is determined in step S23 that all pages of the document 20 have been processed, the printer driver 40 generates print data 60 for any condensed pages that remain to be printed (step S33), and the printer 70 prints the remaining condensed pages on a single sheet (step S34). Steps S26 to S34 are identical to the corresponding steps S6 to S14 in the first embodiment.

Figure 13:
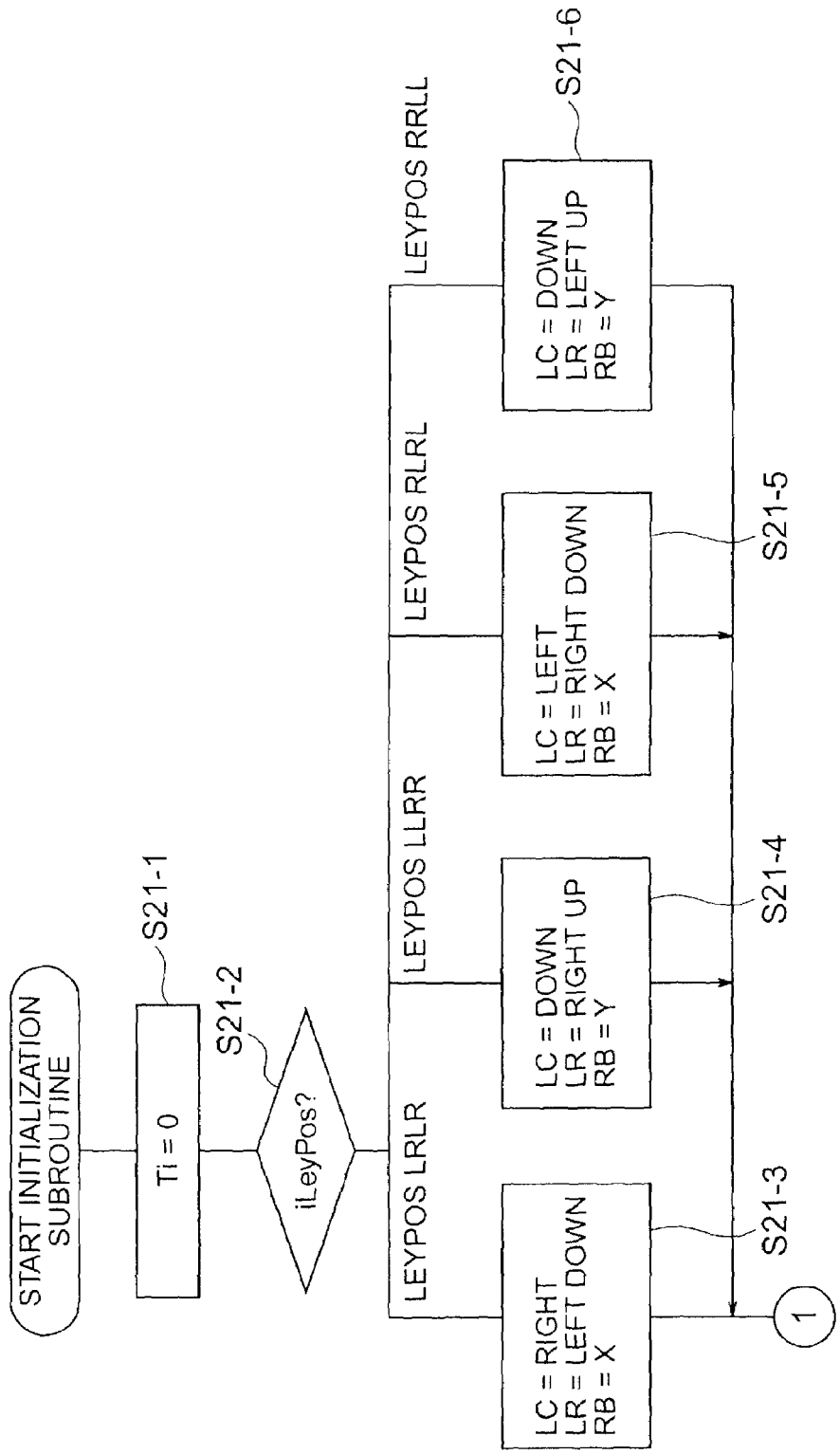
FIGS. 13 and 14 are a flowchart illustrating step S21 in FIG. 12A.

Next, the initialization of the sequence symbol table 80 in step S21 will be described with reference to the flowchart in FIGS. 13 and 14 and the table in FIG. 11.

In this embodiment, different layouts are identified by a value assigned to a variable iLeyPos. If the condensed page sequence starts in the top left corner position, proceeds to the top right corner, and continues from left to right in subsequent rows, ending in the bottom right corner, a value that will be denoted LEYPOS LRLR is assigned to iLeyPos. If the condensed page sequence starts in the top left corner position, proceeds to the bottom left corner, and continues from top to bottom in subsequent columns, ending in the bottom right corner, a value denoted LEYPOS LLRR is assigned to iLeyPos. Similarly, if the condensed page sequence starts in the top right corner position and proceeds from right to left in each row, ending in the bottom left corner, a value denoted LEYPOS RLRL is assigned to iLeyPos. If the condensed page sequence starts in the top right corner position and proceeds from top to bottom in each column, ending in the bottom left corner, a value denoted LEYPOS RRLL is assigned to iLeyPos.

On the printed sheet, only two sequence symbols are used for each layout: a continue symbol and a return symbol. The integer (from one to eight) denoting the continue symbol is assigned to a variable LC; the integer denoting the return symbol is assigned to a variable LR. In the following description, for clarity, the words in FIG. 11 will be used instead of the integers from one to eight. The interval at which the return symbol appears in the condensed page sequence is assigned to a return base variable RB.

To initialize the sequence symbol table 80, the printer driver 40 clears an index count Ti to zero (step S21-1) and tests the variable iLeyPos to determine which layout to use (step S21-2).

If the value of iLeyPos is LEYPOS LRLR, the 'right' value in FIG. 11 is assigned to the continue symbol variable LC, the 'left-down' value is assigned to the return symbol variable LR, and the number X of condensed pages per row is assigned to the return base variable RB (step S21-3). If the value of iLeyPos is LEYPOS LLRR, the 'down' value is assigned to the continue symbol variable LC, the 'right-up' value is assigned to the return symbol variable LR, and the number Y of condensed pages per column is assigned to the return base variable RB (step S21-4). If the value of iLeyPos is LEYPOS RLRL, the 'left' value is assigned to the continue symbol variable LC, the 'right-down' value is assigned to the return symbol variable LR, and the number X of condensed pages per row is assigned to the return base variable RB (step S21-5). If the value of iLeyPos is LEYPOS RRLL, the 'down' value is assigned to the continue symbol variable LC, the 'left-up' value is assigned to the return symbol variable LR, and the number Y of condensed pages per column is assigned to the return base variable RB (step S21-6).

Figure 14:
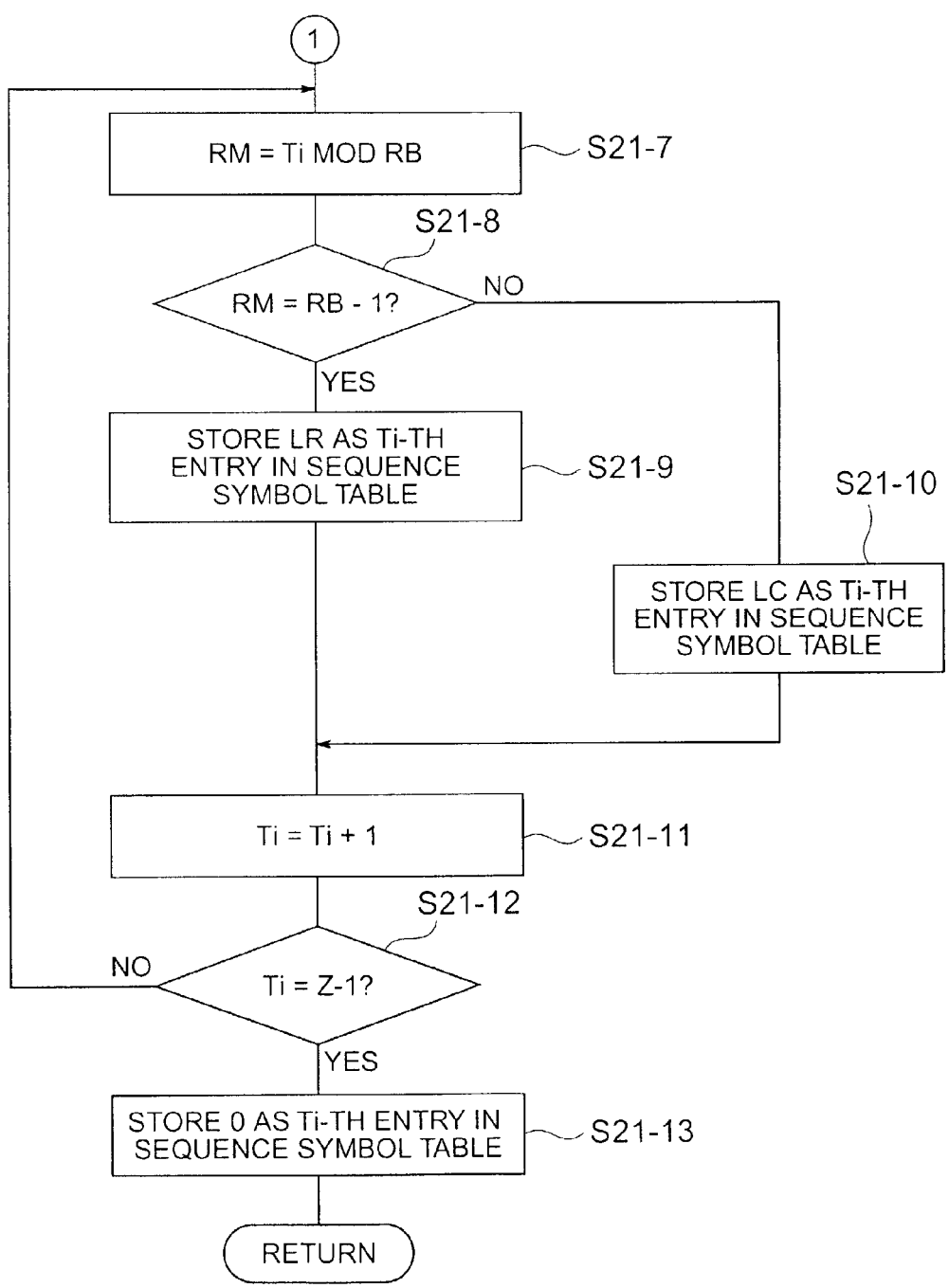

After these assignments have been made, the index count Ti is divided by the return base value RB and the remainder is assigned to a variable RM (step S21-7 in FIG. 14). RM and RB are then compared to determine whether the index count Ti indicates a return position in the layout (step S21-8). If RM is one less than RB, then Ti indicates a return position, so the return sequence symbol LR is stored in the position indicated by index Ti in the sequence symbol table 80 (step S21-9). If RM has any other value, then Ti does not indicate a return position, so the continue sequence symbol LC is stored in the position indicated by index Ti in the sequence symbol table 80 (step S21-10). More precisely, the integer assigned to LR or LC is stored in the sequence symbol table 80.

After step S21-9 or S21-10, the index count Ti is incremented (step S21-11) and compared with the number Z of pages per sheet (step S21-12). If Ti is one less than Z, the value zero, representing no sequence symbol, is stored at the position indicated by Ti to complete the initialization of the sequence symbol table 80 (step S21-13). Otherwise, the process returns to step S21-7 to calculate a new remainder and store another entry in the sequence symbol table 80.

Figure 12A:
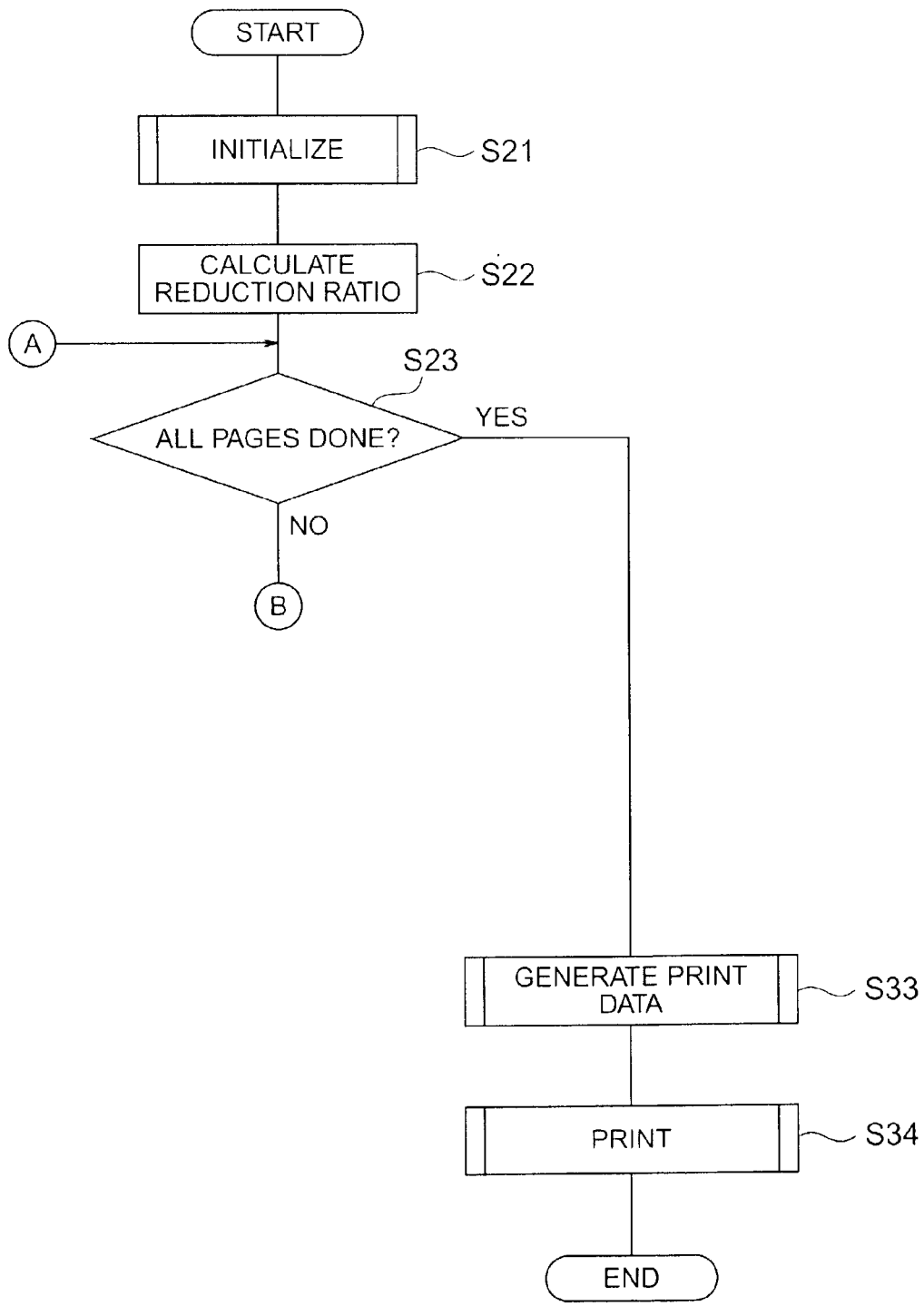
FIGS. 12A and 12B are a flowchart illustrating the operation of the second embodiment.

The loop from step S21-7 to step S21-12 is accordingly executed Z–1 times, the last execution being followed by step S21-13, then a return to the main routine in FIG. 12A.

Next, the process of generating sequence symbol image data will be described with reference to the flowchart in FIG. 15. This process is executed by the printer driver 40 as a subroutine.

Figure 12B:
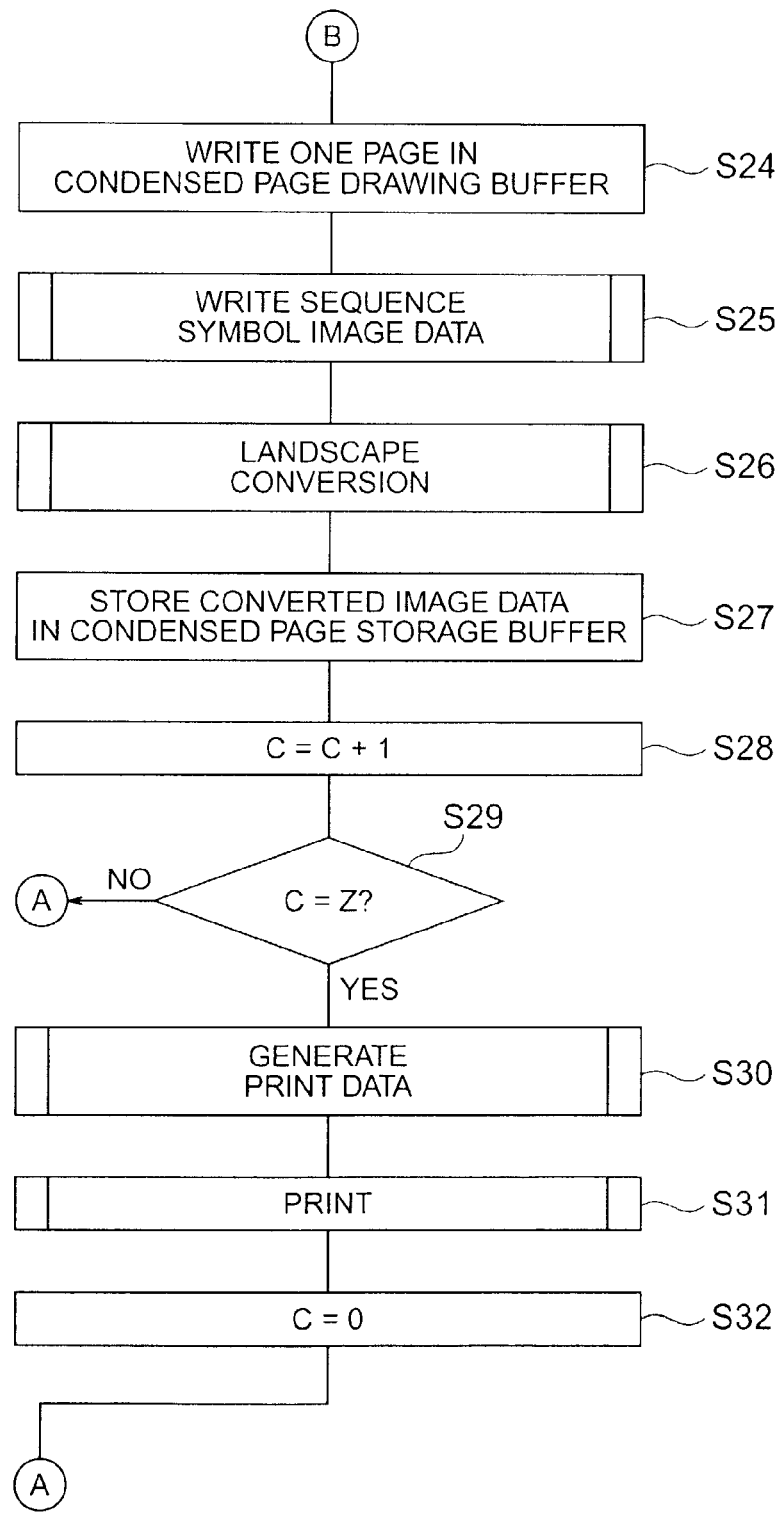
Figure 15:
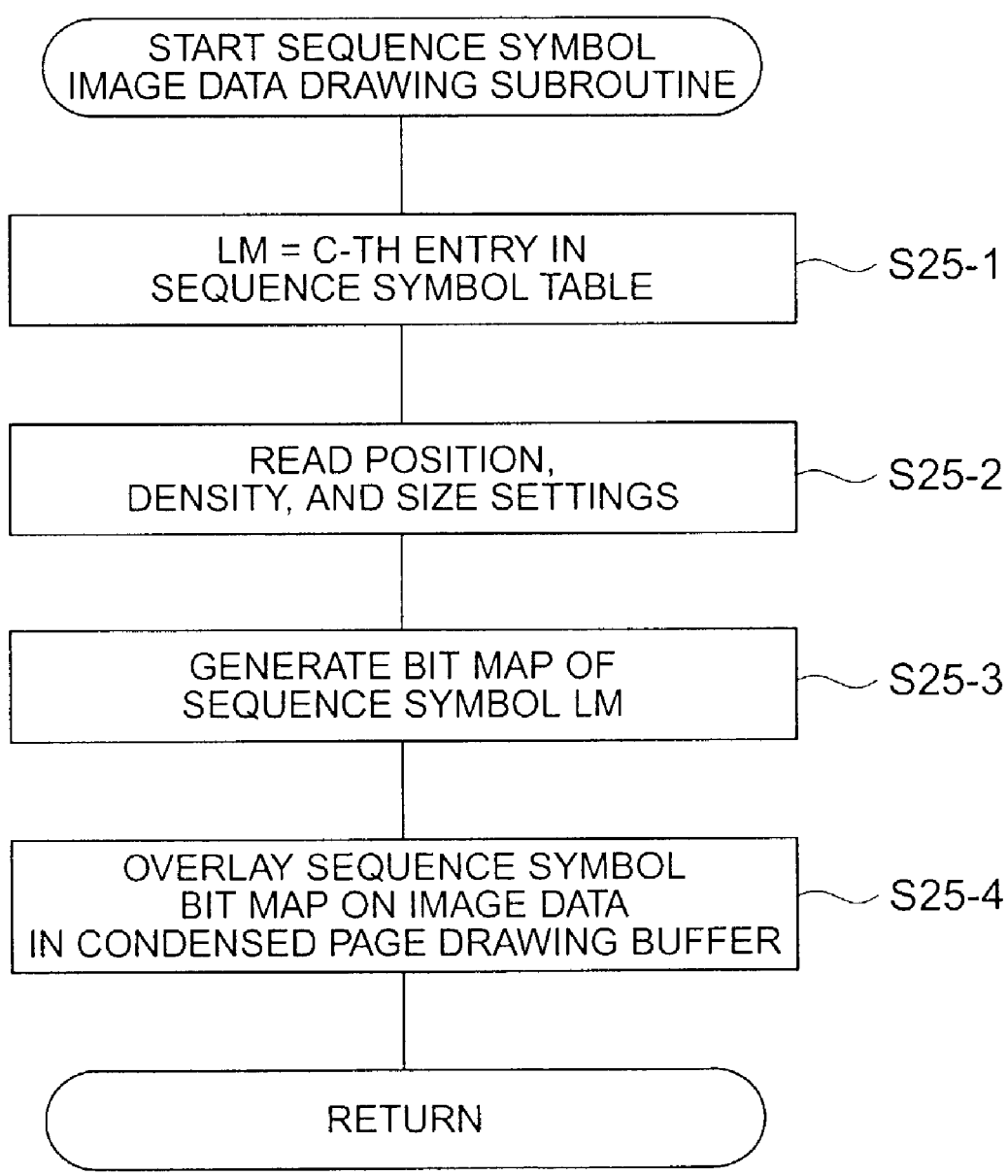
FIG. 15 is a flowchart illustrating step S25 in FIG. 12B.

When invoked in step S25 in FIG. 12B, the sequence symbol overlay processor 79 receives the relative sequence number of the condensed page currently being processed (equal to the condensed page count C) and assigns the corresponding entry in the sequence symbol table 80 to a layout marker variable LM (step S25-1 in FIG. 15). Settings made by the setting processor 49 are then read to decide how to draw the corresponding sequence symbol (step S25-2). These settings include, for example, the drawing position in the condensed page drawing buffer 43 (given by coordinates NPCX, NPCY), the drawing density NPCD, and the symbol size NPCS. On the basis of the NPCD and NPCS settings, the sequence symbol overlay processor 79 generates bit-mapped image data NPCIM for the sequence symbol corresponding to the value of LM (step S25-3). Finally, the sequence symbol overlay processor 79 overlays the bit-mapped image data NPCIM on the image data stored in the condensed page drawing buffer 43 at the position indicated by coordinates NPCX and NPCY (step S25-4). This step is followed by a return to the main processing routine in FIG. 12B.

Figure 16:
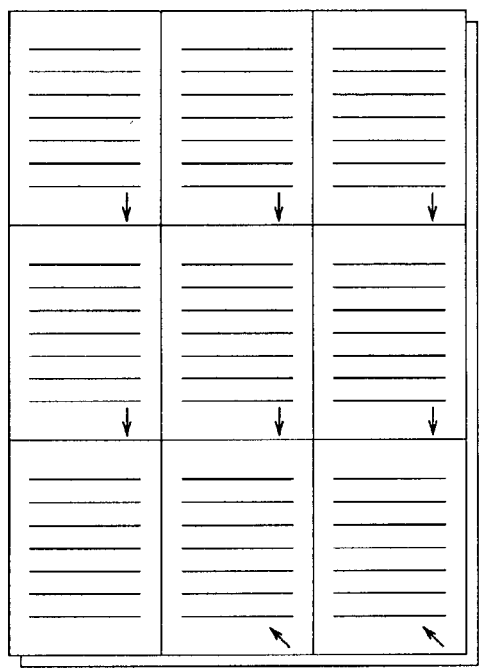
FIG. 16 illustrates condensed pages and overlaid sequence information printed in the second embodiment.

FIG. 16 shows nine condensed pages printed on a single sheet according to the second embodiment. Arrows are printed in the bottom right corner of each page to indicate the order in which the pages should be read. No arrow is printed on the last page in the bottom left corner of the sheet. The reader follows the arrows from the top to the bottom of each column, then is pointed toward the top of the next column. The arrows have an intuitively obvious meaning. Even if the document 20 has numbered pages, the reader will find it easier to follow the arrows than to check the page numbers.

The sequence symbols used in the second embodiment are not limited to arrows. Other sequence symbols, such as a drawing of a human hand pointing to the next page, can be used.

An advantage of the second embodiment, as compared with the first embodiment, is that when the document 20 has numbered pages, the reader cannot confuse the page numbers with the sequence symbols.

In a third embodiment of the invention, the layout of condensed pages on a sheet of printing media is indicated by a print sample display on a display unit of the host device before the document is printed.

The print sample is displayed when the user interacts, with the setting processor 49 to select the condensed page layout. Typically, while working with the application program 10 on the host device, the user uses a keyboard or pointing device to select a 'file' menu, then selects a 'print' option from the file menu, causing a printing dialog box to be displayed on the screen of the display unit. Next, the user selects a 'properties' item in the printing dialog box, causing the setting processor 49 to display a further dialog box on the screen. This further dialog box includes various buttons that the user can click with a pointing device to specify the desired condensed page layout, and a display area in which the print sample is displayed. Alternatively, the dialog box may include a list of various possible page layouts, which can be selected with the pointing device, instead of buttons.

Figure 17:
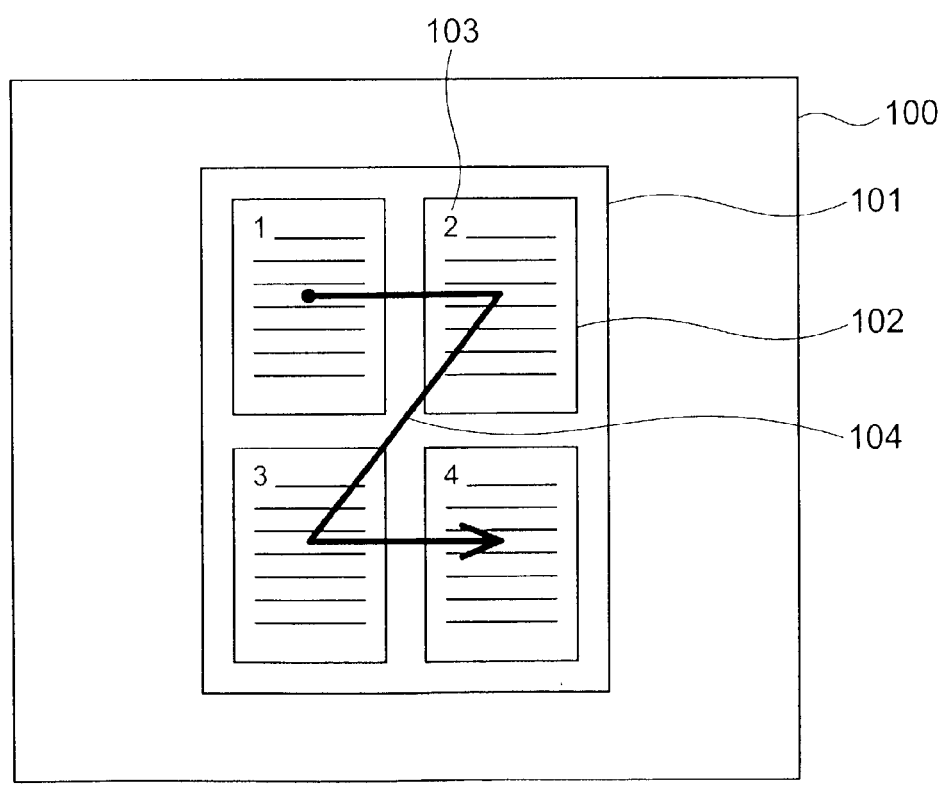
FIGS. 17, 18A, and 18B show examples of condensed pages and overlaid sequence information displayed in print samples in a third embodiment of the invention.
Figure 18A:
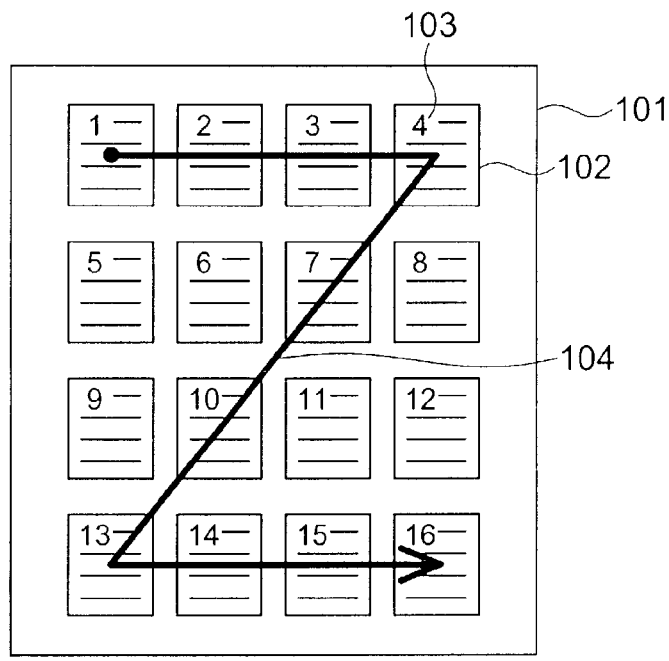
Figure 18B:
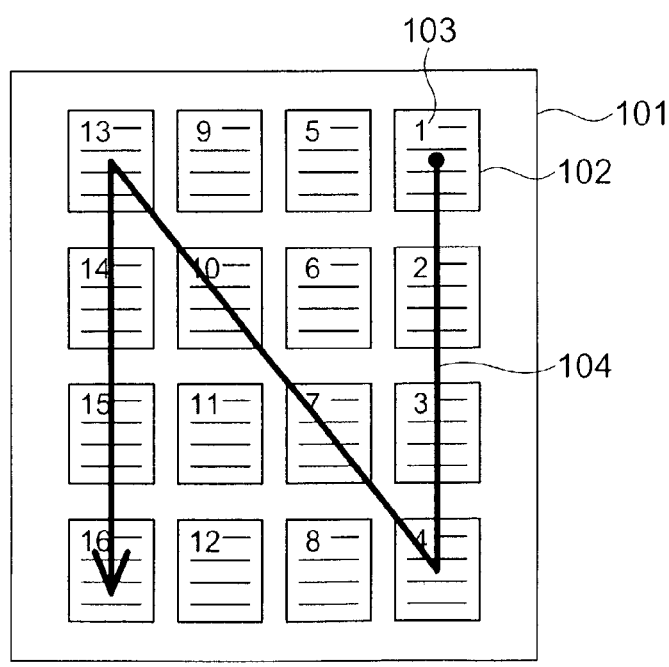

FIGS. 17, 18A, and 18B show examples of the print sample display.

In FIG. 17, the user has selected a layout with four condensed pages per sheet, laid out in two rows and two columns (X=Y=2) in a left-to-right horizontal or row sequence (LEYPOS LRLR) In the print sample display area 100, the setting processor 49 displays a print sample image 101 including a rectangular border 102 around each condensed page and a sequence number 103 overlaid on each condensed page. The setting processor 49 also displays a sequence line 104 overlaid on the print sample image 101. The sequence line 104 is a zigzag line starting at the center of the first page in the first row and extending horizontally rightward to the center of the last page in the first row, diagonally left and down to the center of the first page in the last row, then horizontally rightward to the center of the last page in the last row. The beginning of the sequence line 104 is marked with a dot, and the end of the sequence line is marked with a triangle. The sequence line 104 and sequence numbers 103 help the user to verify that the desired layout has been selected.

The sequence line 104 and sequence numbers 103 provide substantially the same information, but for an experienced user the sequence line 104 provides verification at a glance, while for an inexperienced user, the sequence numbers help explain the meaning of the sequence line 104.

In FIG. 18A, the user has selected a layout with sixteen condensed pages per sheet, laid out in four rows and four columns (X=Y=4) in a left-to-right row sequence (LEYPOS LRLR). Rectangular borders 102, sequence numbers 103, and a sequence line 104 are displayed in the print sample image 101 as before. The sequence line 104 starts at the top left page, extends all the way across the top row, then extends diagonally down to the bottom page in the leftmost column and all the way across the bottom row.

In FIG. 18B, the user has selected a layout with sixteen condensed pages (X=Y=4) laid out in a right-to-left vertical or column sequence (LEYPOS RRLL). Rectangular borders 102, sequence numbers 103, and a sequence line 104 are displayed in the print sample image 101 accordingly. The sequence line 104 now starts at the top right page and extends down to the last page in the rightmost column, then diagonally up to the top page in the leftmost column, then down to the last page in that column.

Figure 19A:
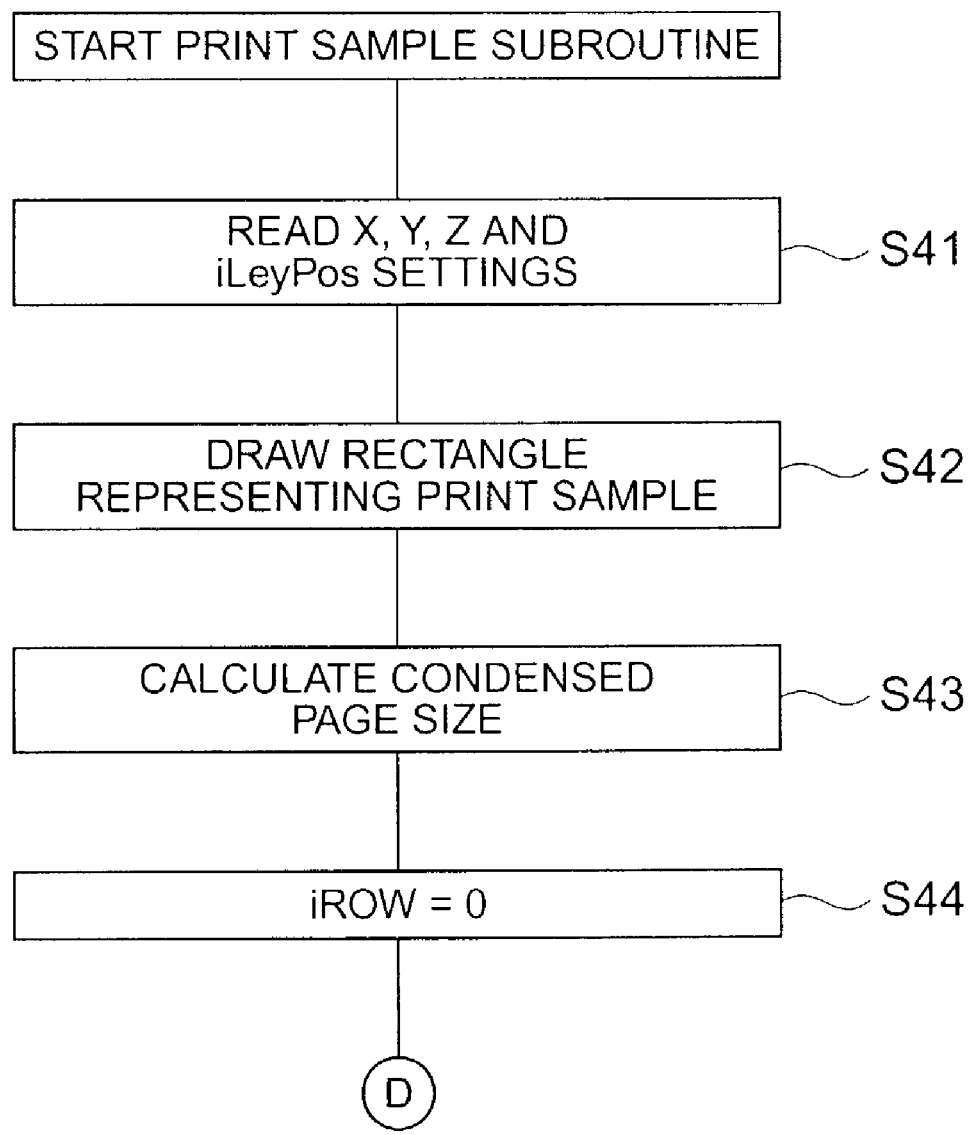
FIGS. 19A and 19B are a flowchart illustrating the operation of a print sample display processing subroutine in the third embodiment.

The operation of the subroutine in the setting processor 49 that generates the print sample will now be described with reference to the flowchart in FIGS. 19A and 19B.

This subroutine begins by reading the selected layout settings, including the number of columns (X), number of rows (Y), number of condensed pages per sheet (Z), and layout type (iLeyPos) (step S41 in FIG. 19A), and drawing a rectangle representing the print sample image 101 in the center of the print sample display area 100 in the dialog box (step S42). Next, the rectangular size NRECT of each condensed page on the sample display is calculated from the size of the print sample image 101, the number of columns (X), and the number of rows (Y) (step S43).

As a specific example, if the selected layout has four condensed pages (Z=4) arranged in two rows (X=2) and two columns (Y=2) in a right-to-left row sequence (iLeyPos=RLRL), if the printing media size is the standard A4 size with a width of two hundred ten millimeters (210 mm) and a height of 297 mm, if the display area has a width (DX) of 183 dots and a height (DY) of 155 dots on the screen, including ten-dot margins on all sides, then the height (SY) of the print sample image 101 is 135 dots (SY=DY−2×10=155−20), and the width (SX) of the print sample image 101 is 95 dots (SX=135×210÷297=95). The top left corner of the print sample image 101 has dot coordinates Sposx=44 and Sposy=10, which are calculated as follows:

$$Sposx=(SX-DX)\div 2=(183-95)\div 2=44$$

$$Sposy=(SY-DY)\div 2=(155-135)\div 2=10$$

In step S42, accordingly a rectangle 95 dots wide and 135 dots high is drawn with its top left corner at relative dot coordinates (44, 10) within the display area.

In step S43, if a four-dot horizontal margin MX and a six-dot vertical margin MY is allowed between condensed pages, then the width NRECT_X and height NRECT_Y of the condensed page rectangle NRECT are calculated as follows:

$$NRECT\_X=\{SX-(MX\times X)\}\div X=\{95-(4\times 2)\}\div 2=43 \text{ dots}$$

$$NRECT\_Y=\{SY-(MY\times Y)\}\div Y=\{135-(6\times 2)\}\div 2=61 \text{ dots}$$

Figure 19B:
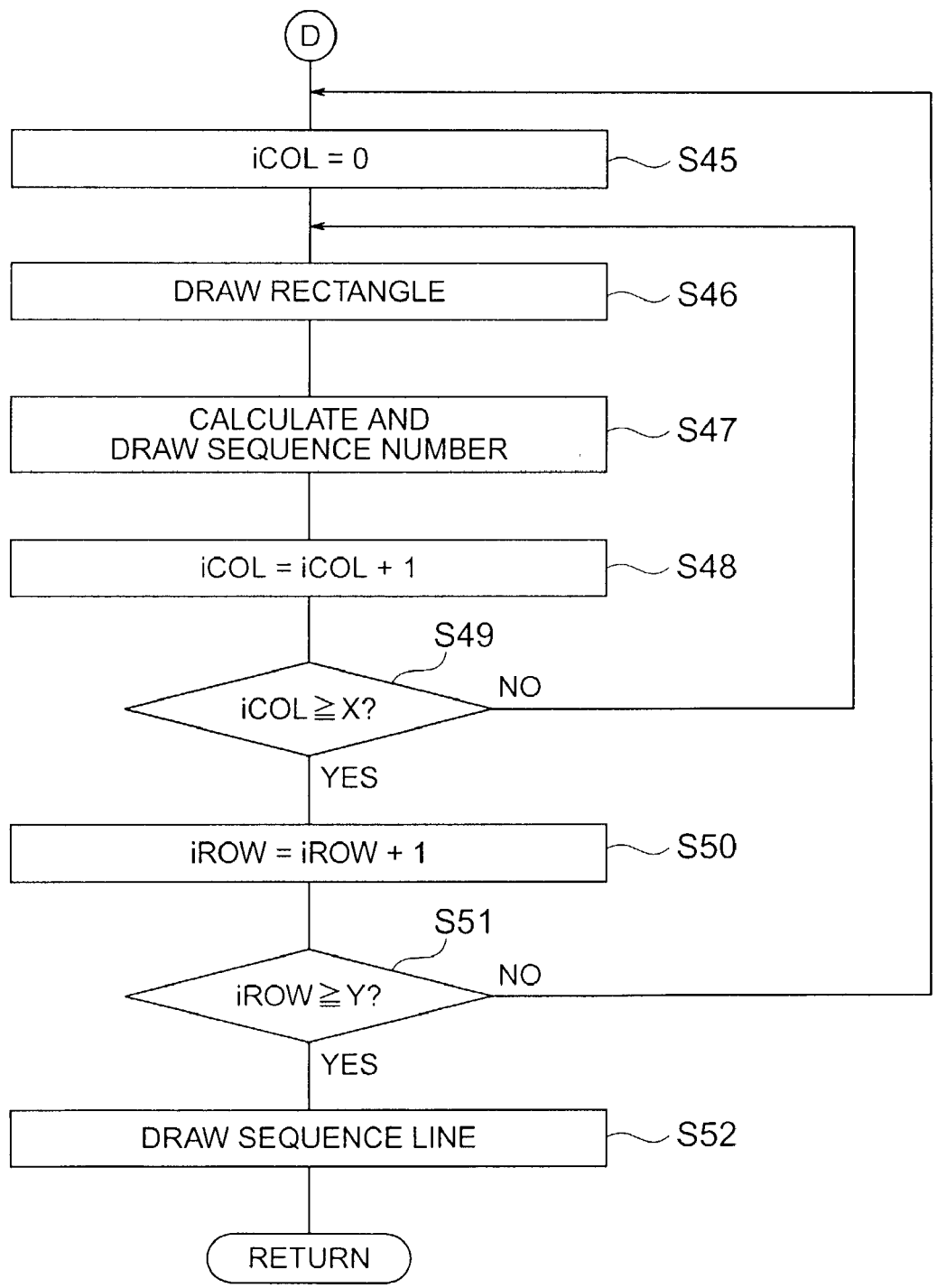

Next, an absolute row count variable iROW is cleared to zero (step S44) and an absolute column count variable iCOL is cleared to zero (step S45 in FIG. 19B). The rectangular border 102 of the current condensed page is then drawn at a position corresponding to these counts iROW, iCOL and the rectangular size NRECT (step S46).

The relative coordinates Nposx, Nposy of the top left corner of rectangular border 102 of the current condensed page within the display area are calculated as follows:

$$Nposx=Sposx+MX+\{iCOL\times(NRECT\_X+MX)\}$$

$$Nposy=Sposy+MY+\{iROW\times(NRECT\_Y+MY)\}$$

For the first condensed page (iCOL=0, iROW=0) in the specific example given above, the coordinates have the following values:

$$Nposx=44+4+\{0\times(43+4)\}=48 \text{ dots}$$

$$Nposy=10+6+\{0\times(61+6)\}=16 \text{ dots}$$

The sequence number 103 of the current page is now calculated from the values of iROW and iCOL, and this sequence number is drawn inside the rectangular border 102 (step S47). The formula for calculating the sequence number depends on the selected layout (iLeyPos) as indicated below.

$$iLeyPos=LRLR{:}Seq.\ No.=(iROW\times X)+iCOL+1$$

$$iLeyPos=LLRR{:}Seq.\ No.=(iCOL\times Y)+iROW+1$$

$$iLeyPos=RLRL{:}Seq.\ No.=(iROW\times X)+X-iCOL$$

$$iLeyPos=RRLL{:}Seq.\ No.=\{(X-iCOL-1)\times Y\}+iROW+1$$

In the example under discussion, in which iLeyPos=RLRL, the sequence number of the first page (iROW=0, iCOL=0) is two ((0×2)+2−0=2).

After step S47, the absolute column count iCOL is incremented (step S48) and compared with the number of columns X (step S49). If iCOL is less than X, the process returns to step S46 to draw the rectangular border 102 of another condensed page in the same row. If iCOL is equal to or greater than X, then the absolute row count iROW is incremented (step S50) and compared with the number of rows Y (step S51). If iROW is less than Y, the process returns to step S45 to clear the absolute column count iCOL and start processing the next row. If iROW is equal to or greater than Y, indicating that all rows have been processed, then a sequence line 104 is drawn on the print sample image 101 according to the layout settings (step S52). The sequence line 104 joins the centers of the condensed pages in the top left, top right, bottom left, and bottom right corners of the print sample image 101. A dot is drawn at the beginning of the sequence line 104 and a triangle is drawn at the end.

In the example under discussion, the second condensed page rectangle NRECT (iCOL=1, iROW=0) is drawn with its top left corner positioned at the following relative coordinates:

$$Nposx=44+4+\{1\times(43+4)\}=95 \text{ dots}$$

$$Nposy=10+6+\{0\times(61+6)\}=16 \text{ dots}$$

The sequence number of the second rectangle is equal to one ((0×2)+2−1=1). The third condensed page rectangle (iCOL=0, iROW=1) is drawn with its top left corner in the following position:

$$Nposx=44+4+\{0\times(43+4)\}=48 \text{ dots}$$

$$Nposy=10+6+\{1\times(61+6)\}=83 \text{ dots}$$

The sequence number of the third rectangle is equal to four ((1×2)+2−0=4). The fourth condensed page rectangle (iCOL=1, iROW=1) is drawn in the following position:

$$Nposx=44+4+\{1\times(43+4)\}=95 \text{ dots}$$

$$Nposy=10+6+\{1\times(61+6)\}=83 \text{ dots}$$

The sequence number of the third rectangle is equal to three ((1×2)+2−1=3).

During steps S44 to S50, when the top left, top right, bottom left, and bottom right condensed pages are drawn, their center coordinates are stored for use in drawing the sequence line. The center coordinates are calculated as Nposx+(NRECT_X÷2) and Nposy+(NRECT_Y÷2). The four pairs of calculated center coordinates are stored in an array Pt(i) indexed by a variable i to which values from zero to three are assigned as follows:

When iROW=0 and iCOL=0,
  if iLeyPos=RRLL then i=2;
  if iLeyPos=RLRL then i=1;
  otherwise i=0.
When iROW=0 and iCOL=X−1,
  if iLeyPos=RRLL or RLRL then i=0;
  if iLeyPos=LLRR then i=2;
  if iLeyPos=LRLR then i=1.
When iROW=Y−1 and iCOL=0,
  if iLeyPos=RRLL or RLRL then i=3;
  if iLeyPos=LLRR then i=1;
  if iLeyPos=LRLR then i=2.
When iROW=Y−1 and iCOL=X−1,
  if iLeyPos=RRLL then i=1;
  if iLeyPos=RLRL then i=2;
  otherwise i=3.

In the specific example under discussion, the following relative dot coordinates are stored in array the Pt(i):

Pt(0)=(116, 40)
Pt(1)=(69, 40)
Pt(2)=(116, 107)
Pt(3)=(69, 107)

The sequence line is drawn by drawing a filled circle with a diameter of five dots at the point given by the pair of coordinates stored as Pt(0), then drawing a straight line segment from this point Pt(0) to point Pt(1), another line segment from Pt(1) to Pt(2), and another line segment from Pt(2) to Pt(3), and finally drawing a triangle at point Pt(3). The width of the line segments is three dots. The triangle is oriented so as to form an arrowhead, as shown in FIGS. 17, 18A, and 18B. Specifically, the triangle has an apex pointing to the right if iLeyPos is LRLR, to the left if iLeyPos is RLRL, and down if iLeyPos is LLRR or RRLL.

The print sample image 101 enables the creator of the document 20 or another user to verify both the condensed page layout and the condensed page sequence before the document 20 is printed. When the document 20 is printed, the condensed page sequence is indicated by, for example, sequence numbers or symbols as described in the first and second embodiments, or by one of the methods to be described in the following embodiments.

In the dialog box in which the user selects the page layout sequence, the selection buttons or list preferably include a diagrammatic indication of the layout, instead of or in addition to a verbal description such as 'vertical' or 'horizontal'. Due to limited space, however, the diagrammatic indication is necessarily small, so it is easy for the user to make a mistake in specifying the page layout. By displaying a sequence line prominently on the print sample, the third embodiment makes such layout specification mistakes obvious, so that they can be corrected before any printing is actually performed, thereby avoiding the wasting of time and printing resources. Moreover, even when no specification mistake has been made, the third embodiment saves time in that the user can immediately see from the displayed sequence line that the desired layout has been specified, and does not have to spend time checking page numbers or checking the content of the pages.

In a fourth embodiment of the invention, the layout of condensed pages on a sheet of printing media is indicated by the density of the page borders. The printer driver 40 in the fourth embodiment has substantially the same structure as in the first embodiment, as shown in FIG. 1, except that the sequence number overlay processor is replaced by a module for drawing page borders.

Figure 20A:
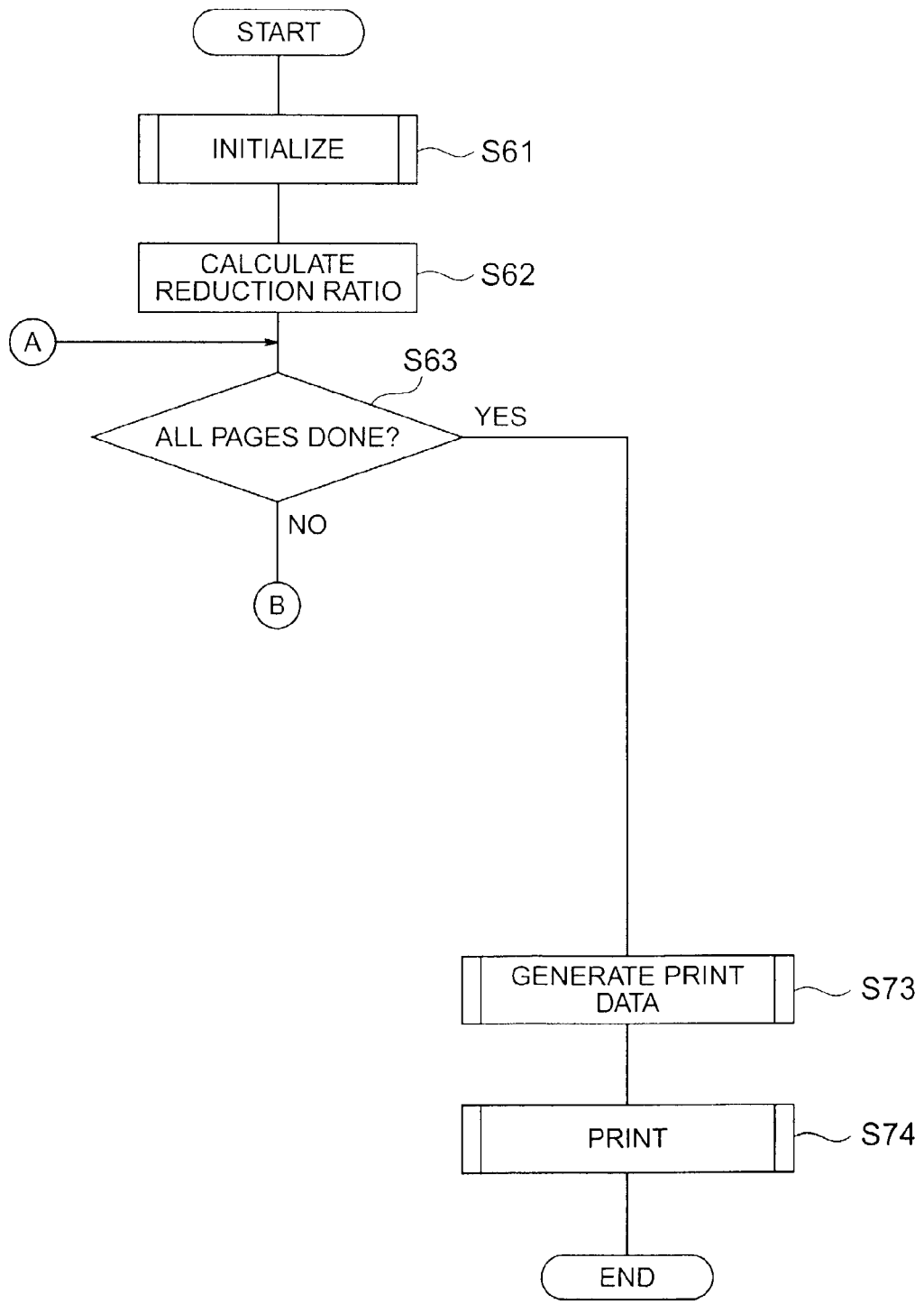
FIGS. 20A and 20B are a flowchart illustrating the operation of a fourth embodiment of the invention.

The operation of the fourth embodiment will be described with reference to the flowchart in FIGS. 20A and 20B.

After an initialization process (step S61 in FIG. 20A) similar to the initialization process in the first embodiment, the reduction ratio n is calculated (step S62), and the printer driver 40 decides if all pages of the document 20 have been processed (step S63). If not, condensed page image data with a reduction ratio of n are generated for the next page and written in the condensed page drawing buffer 43 (step S64 in FIG. 20B). These steps S62-S64 are identical to the corresponding steps S2-S4 in the first embodiment.

A border-drawing module in the printer driver 40, not shown in FIG. 1, now draws a border with a density D for the current page in the condensed page drawing buffer 43, overlaying the border on the condensed page image data (step S65). The density D is altered from page to page to indicate the page sequence. This process will be described in more detail later.

If necessary, the landscape converter 42 converts the image data in the condensed page drawing buffer 43 to the portrait orientation (step S66). Then the image data are stored in the condensed page storage buffer 44 (step S67), and the condensed page count C is incremented (step S68) and compared with the value of Z (step S69). If the condensed page count C is still less than Z, the processing returns to step S63 in FIG. 20A; otherwise, the printer driver 40 generates print data (step S70), the printer 70 prints Z condensed pages on a single printing media sheet (step S71), the condensed page count C is cleared (step S72), and the process returns to step S63.

When it is determined in step S63 that all pages of the document 20 have been processed, the printer driver 40 generates print data 60 for any condensed pages that remain to be printed (step S73), and the printer 70 prints the remaining condensed pages on a single sheet (step S74). Steps S66 to S74 are identical to the corresponding steps S6 to S14 in the first embodiment.

Next, the border-drawing process will be described with reference to the flowchart in FIGS. 21A and 21B. This process is executed by the printer driver 40 as a subroutine in step S65 in FIG. 20B.

Figure 21A:
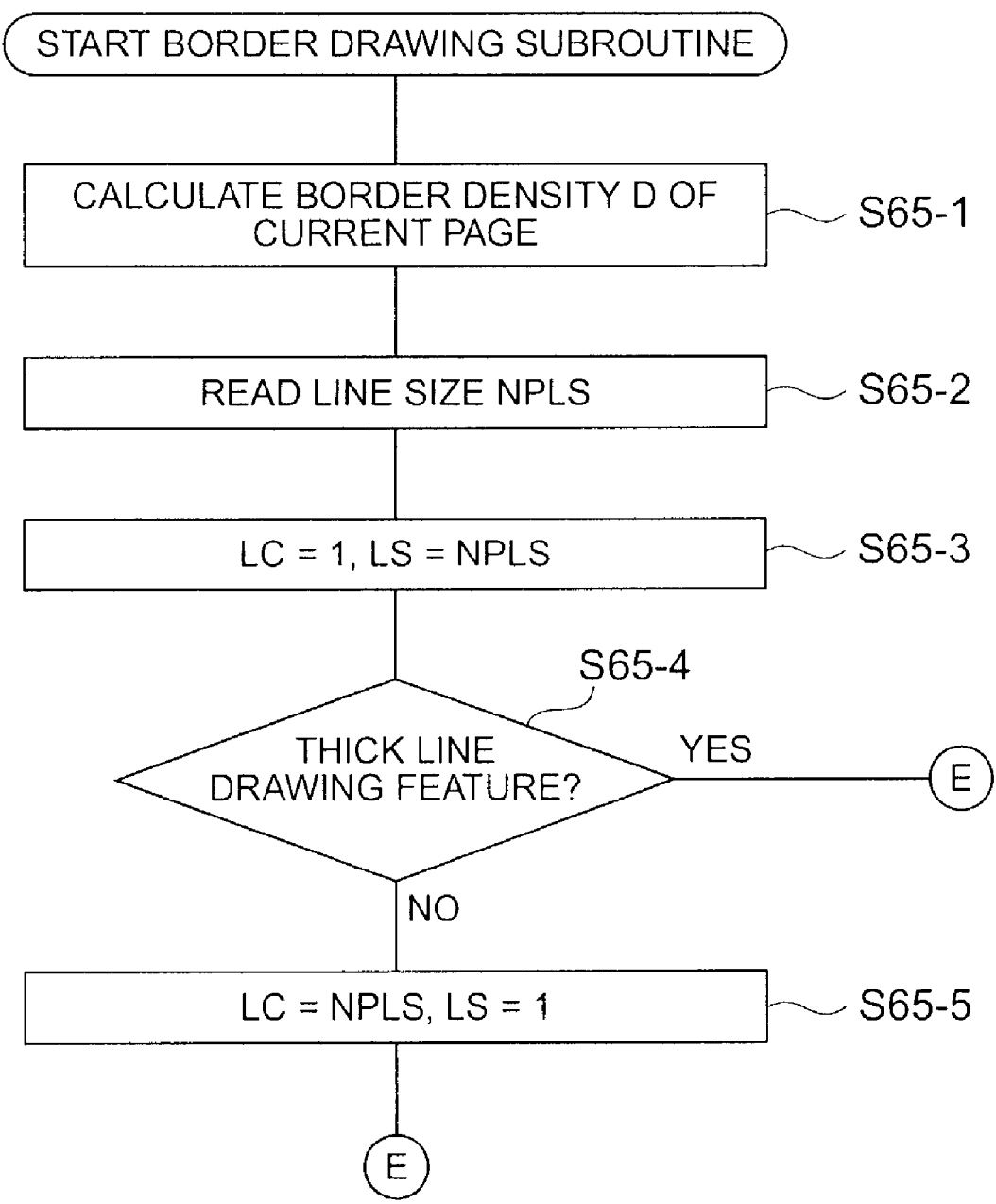
FIGS. 21A and 21B are a flowchart illustrating step S65 in FIG. 20B.

First, the border density D of the current page is calculated (step S65-1 in FIG. 21A). The density is calculated from the condensed page count (C), the number of pages per sheet (Z), and a density coefficient K, by the following formula.

$$D=\{(Z-C)/Z\} \times K$$

This formula assigns the highest border density D to the first page in the page sequence, and decreases the border density with each successive page until the last page in the page sequence. The density coefficient K is equal to, for example, one hundred if the border density D is expressed as a percent, or two hundred fifty-six if D is expressed on a gray scale with two hundred fifty-six levels.

Next, a line size NPLS is read (step S65-2). The line size NPLS, which is one of the settings made by the setting processor 49, specifies the size of the border lines to be drawn on the condensed page image data in the condensed page drawing buffer 43. Then a loop count variable LC is set to one, and a line size variable LS is set to the value of NPLS (step S65-3).

Next, a check is made to see if the printer driver 40 has a thick line drawing feature (step S65-4). If not, the value of the loop count variable LC is changed to NPLS, and the value of the line size variable LS is changed to one (step S65-5). In this case, the border will be drawn with thin lines NPLS times, changing the position of the lines each time. If the printer driver 40 has a thick line drawing feature, the border will be drawn just once, and step S65-5 is skipped.

Figure 21B:
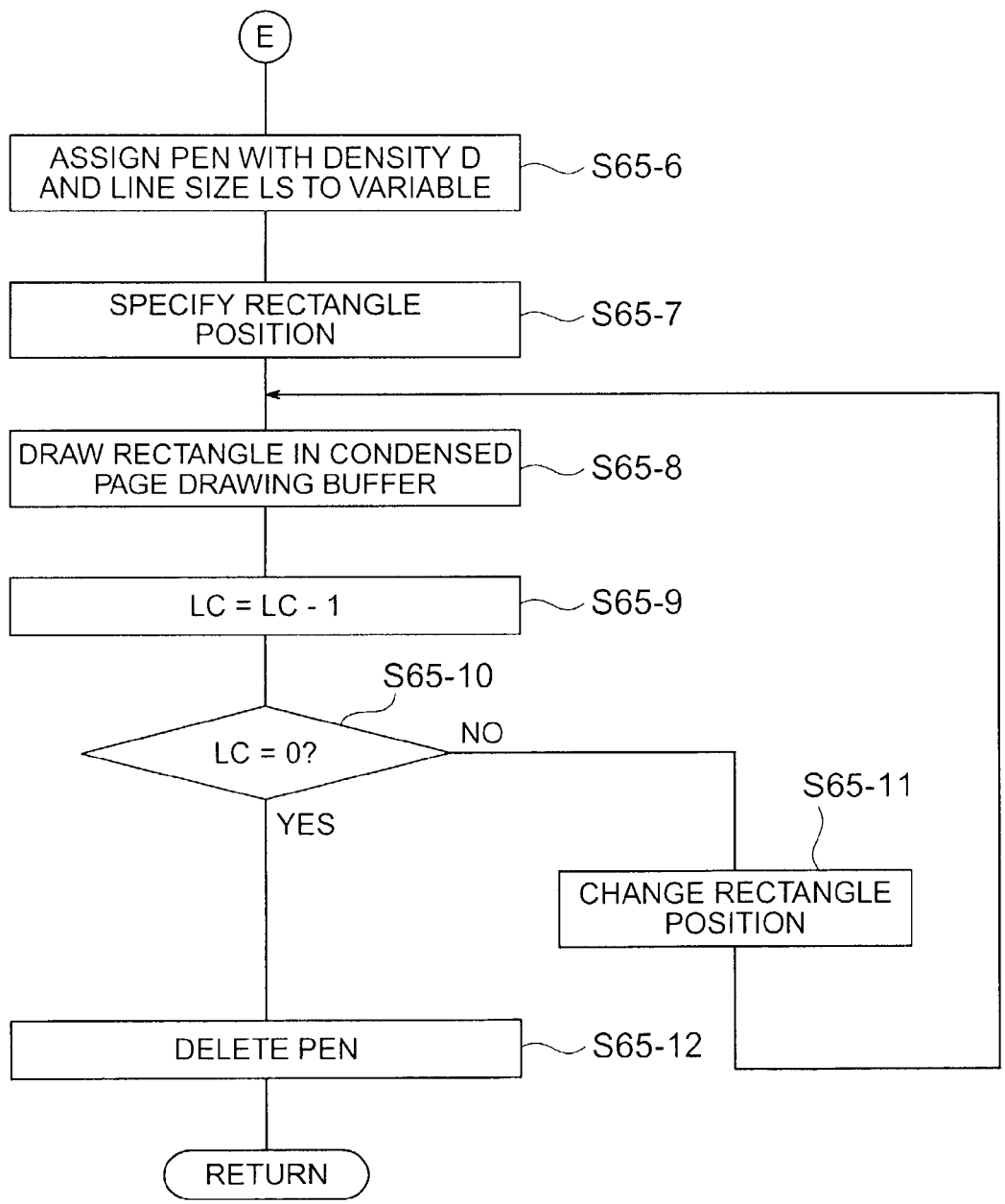

Next, a pen with density D and line size LS is assigned to a pen variable PPEN (step S65-6 in FIG. 21B). A pen, in this context, refers to a bit pattern used to draw lines with a specified size (width) and density.

Next, the position at which to draw the border lines is specified (step S65-7). The position is specified as a rectangle (RECT) defined by four variables named Top, Bottom, Left, and Right, indicating the positions of the corresponding parts of the border. In step S65-7, Top and Left are set to zero, Bottom is set to the condensed page height, and Right is set to the condensed page width.

A border is now drawn with the pen specified by PPEN in the position specified by RECT (step S65-8), using OR logic so as not to erase the existing image data in the condensed page drawing buffer 43. Next, the loop count LC is decremented (step S65-9) and tested (step S65-10). If the loop count LC is greater than zero, then the border position RECT is changed by incrementing the Top and Left variables and decrementing the Bottom and Right variables, thereby shrinking the border inward (step S65-11), after which the process returns to step S65-8 to draw the border again.

Figure 20B:
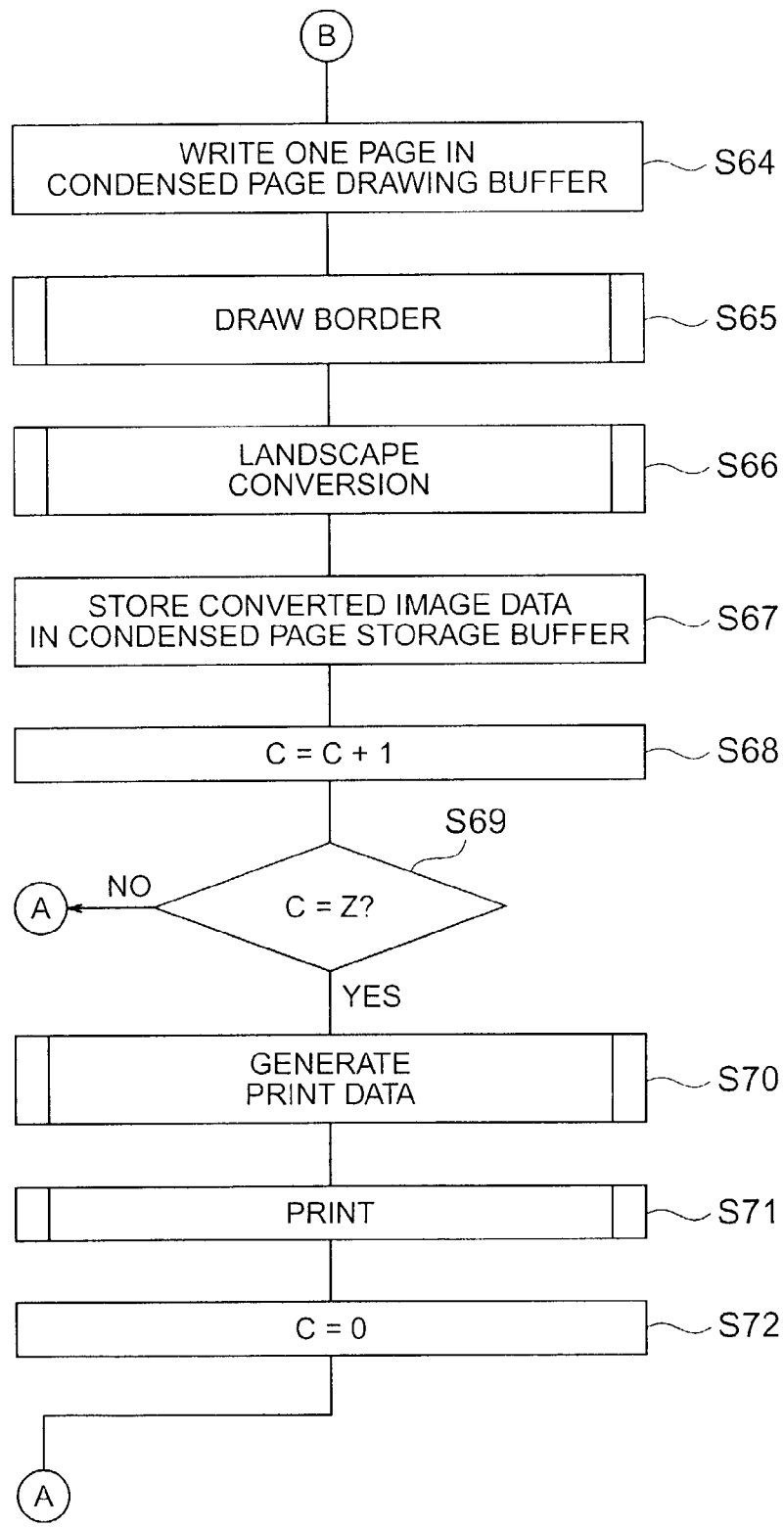

The loop from step S65-8 to step S65-11 is repeated until the loop count LC becomes zero, at which point the pen is deleted (step S65-12) and the processing returns to the main routine in FIG. 20B.

Figure 22:
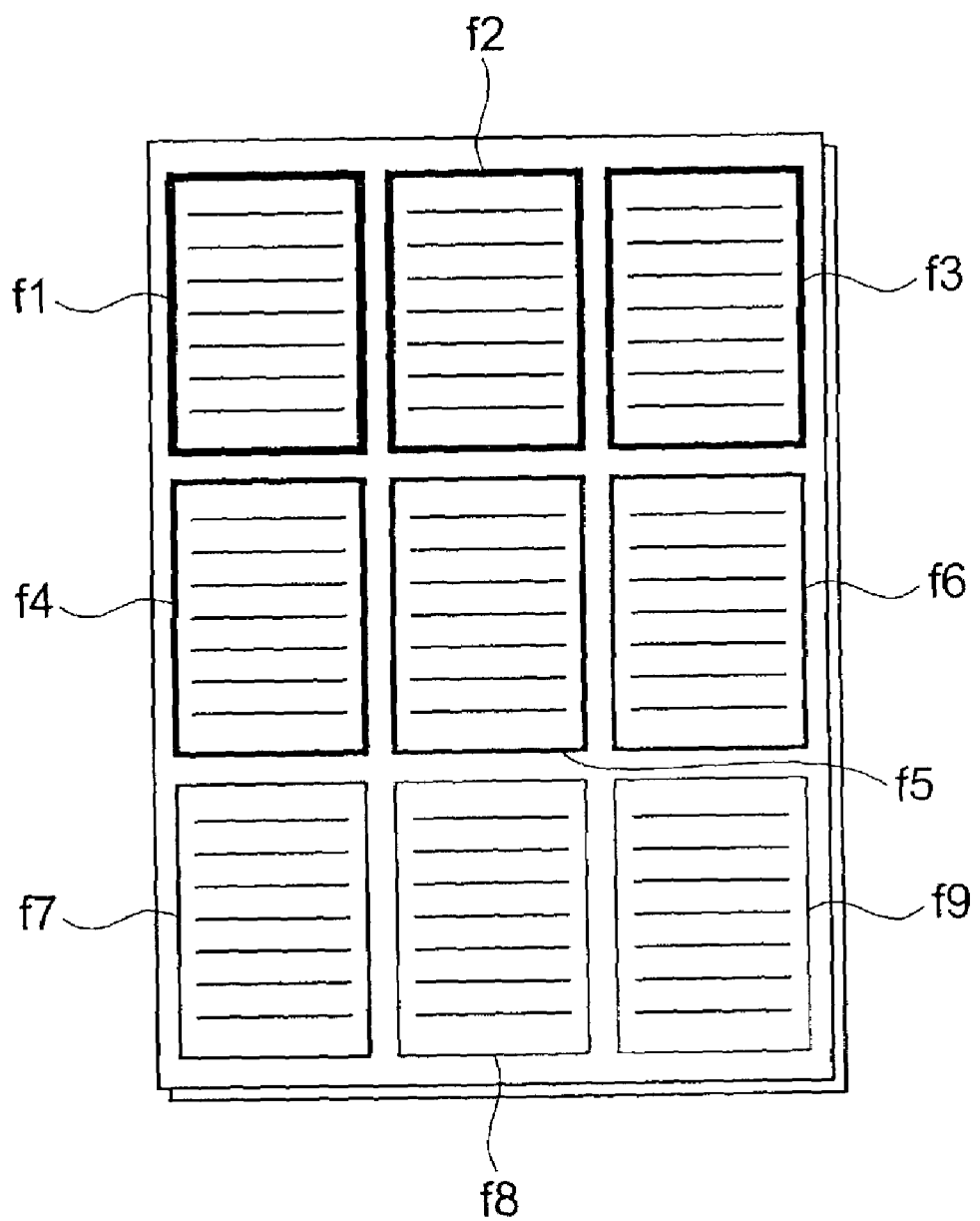
FIG. 22 illustrates condensed pages and overlaid sequence information printed in the fourth embodiment.

FIG. 22 shows a sheet on which nine condensed pages are printed according to the fourth embodiment, using a left-to-right row layout. The border lines f1 to f9 become increasingly less dense. A reader of the condensed document can immediately recognize the page sequence from the decreasing border density, without having to hunt for page numbers or determine the page sequence from the content of printed text on the pages.

In conventional condensed printing, all pages on the same sheet have the same type of border. By varying the density of the border, the fourth embodiment is able to indicate the page sequence without taking up any extra space on the condensed pages.

In a variation of the fourth embodiment, the borders are printed in color, and the page layout sequence is indicated by varying the border color. For example, the first condensed page may have a border printed with yellow ink, the next condensed page may have a border printed with both yellow and magenta ink, and so on.

In a fifth embodiment of the invention, the layout of condensed pages on a sheet of printing media is indicated by the density of page shading added at the right and bottom edges of each condensed page. The printer driver 40 in the fourth embodiment has substantially the same structure as in the first embodiment, shown in FIG. 1, except that the sequence number overlay processor is replaced by a page shading module.

Figure 23A:
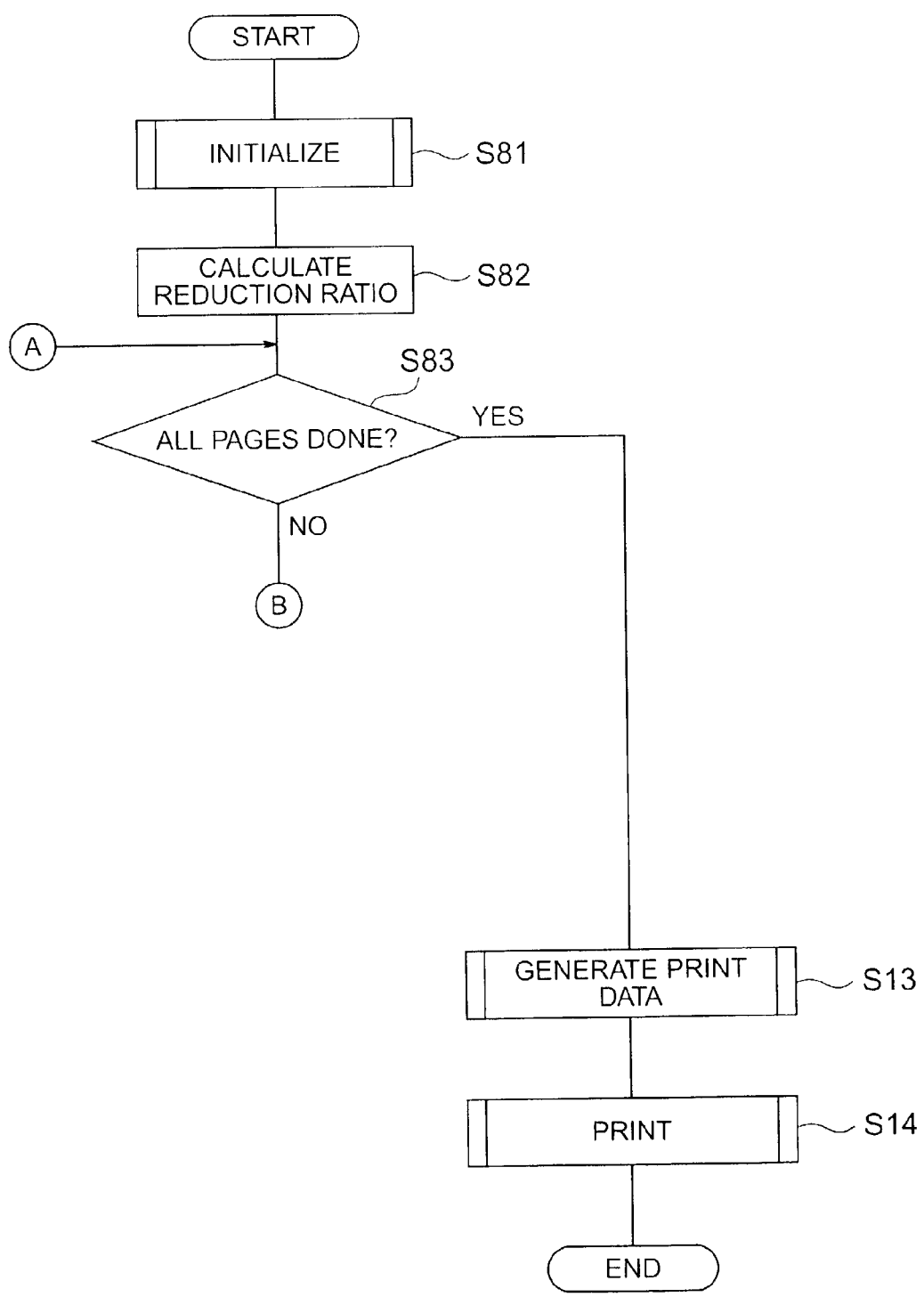
FIGS. 23A and 23B are a flowchart illustrating the operation of a fifth embodiment of the invention.
Figure 23B:
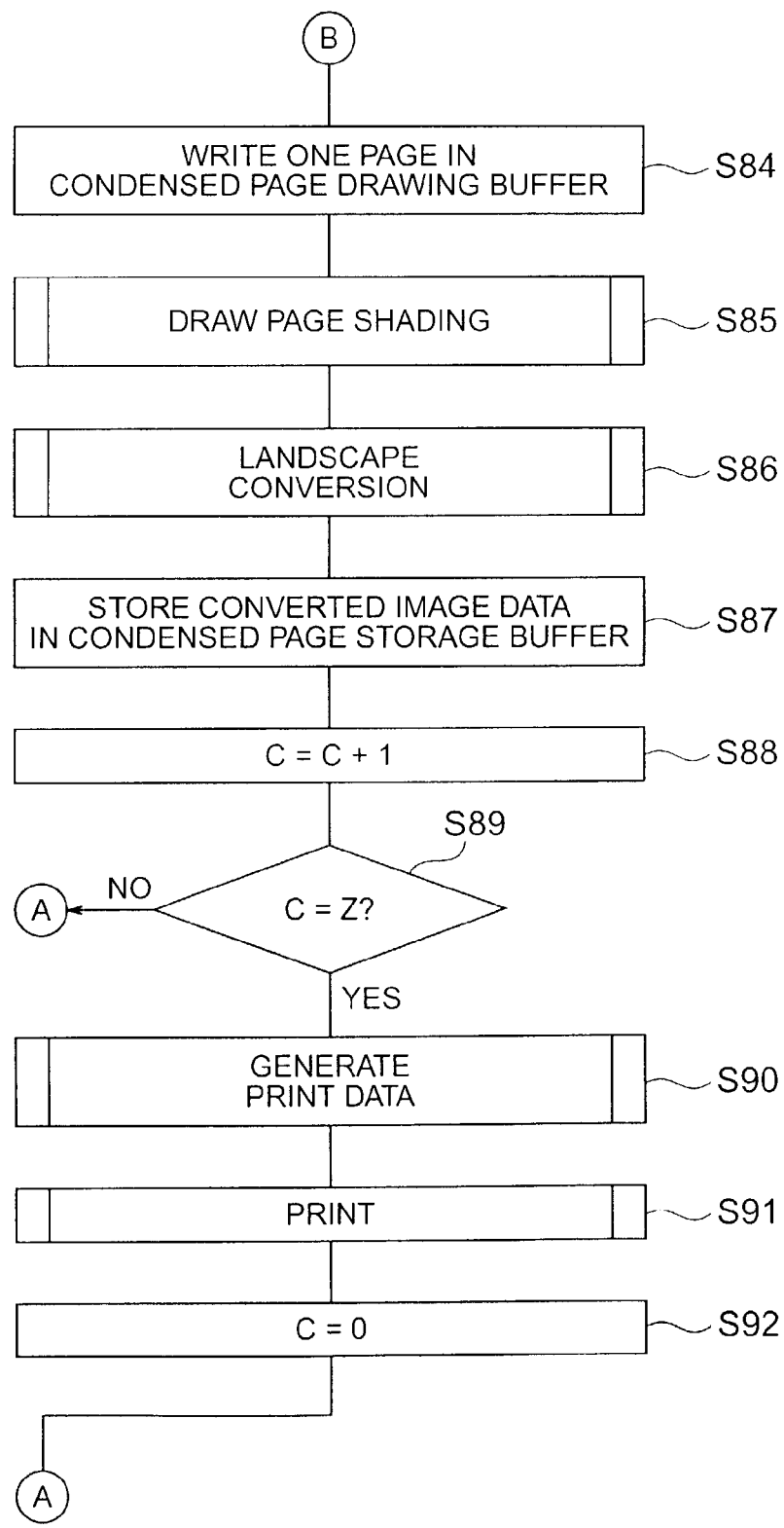

The operation of the fifth embodiment will be described with reference to the flowchart in FIGS. 23A and 23B.

After an initialization process (step S81 in FIG. 23A) similar to the initialization process in the first embodiment, the reduction ratio n is calculated (step S82), and the printer driver 40 decides if all pages of the document 20 have been processed (step S83). If not, condensed page image data with a reduction ratio of n are generated for the next page and written in the condensed page drawing buffer 43 (step S84 in FIG. 23B). These steps S82-S84 are identical to the corresponding steps S2-S4 in the first embodiment.

The page shading module in the printer driver 40, not shown in FIG. 1, now draws shading with a density E adjacent to the right and lower edges of the current page in the condensed page drawing buffer 43, overlaying the shading on the condensed page image data (step S85). The density E is altered from page to page to indicate the page sequence. This step will be described in more detail later.

If necessary, the landscape converter 42 converts the image data in the condensed page drawing buffer 43 to the portrait orientation (step S86). Then the image data are stored in the condensed page storage buffer 44 (step S87), and the condensed page count C is incremented (step S88) and compared with the value of Z (step S89). If C is still less than Z, the processing returns to step S83; otherwise, the printer driver 40 generates print data (step S90), the printer 70 prints Z condensed pages on a single printing media sheet (step S91), C is cleared (step S92), and the process returns to step S83.

When it is determined in step S83 that all pages of the document 20 have been processed, the printer driver 40 generates print data 60 for any condensed pages that remain to be printed (step S93), and the printer 70 prints the remaining condensed pages on a single sheet (step S94). Steps S86 to S94 are identical to the corresponding steps S6 to S14 in the first embodiment.

Next, the shading process will be described with reference to the flowchart in FIG. 24. This process is executed by the printer driver 40 as a subroutine in step S85 in FIG. 23B.

Figure 24:
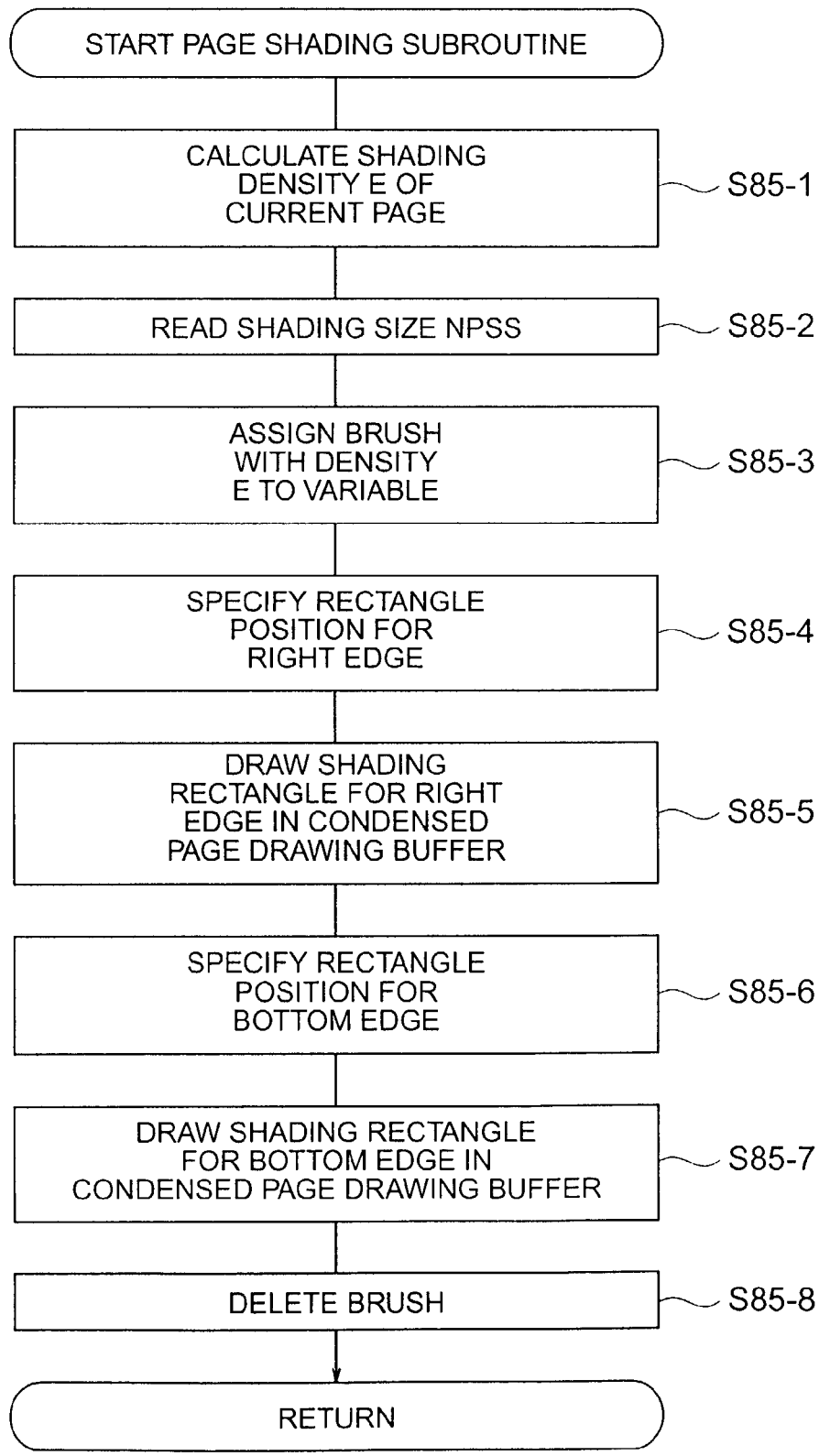
FIG. 24 is a flowchart illustrating step S85 in FIG. 23B.

First, the shading density E of the current page is calculated (step S85-1 in FIG. 24). The density is calculated from the condensed page count (C), the number of pages per sheet (Z), and a density coefficient K by the following formula.

$$E=\{(Z-C)/Z\} \times K$$

This formula assigns the highest shading density E to the first page in the page sequence, and decreases the shading density with each successive page until the last page in the page sequence. The density coefficient K is equal to, for example, one hundred if the shading density E is expressed as a percent, or two hundred fifty-six if E is expressed on a gray scale with two hundred fifty-six levels.

Next, the size NPSS of the shading to be overlaid on the condensed page image data is read from the printing conditions set by the setting processor 49 (step S85-2), and a brush for drawing shading with density E is generated and assigned to a brush variable PBRUSH (step S85-3). A brush, in this context, refers to a bit pattern used to fill an area with shading of a specified density.

Next, the position of the shading at the right edge of the condensed page is specified (step S85-4). The right-edge shading fills a rectangular area (RECT) specified by four variables (Top, Bottom, Left, and Right). In step S85-4, Top is set to zero, Left is set to a value equal to the difference between the condensed page width and the shading size NPSS, Bottom is set to the condensed page height, and Right is set to the condensed page width. The right-edge shading is then drawn in this rectangular area, using the brush assigned to the variable PBRUSH (step S85-5).

Next, the position of the rectangle (RECT) of shading at the bottom edge of the condensed page is similarly specified (step S85-6), and the bottom-edge shading is drawn, again using the brush assigned to the variable PBRUSH (step S85-7). In step S85-6, Top is set to the difference between the condensed page height and the shading size NPSS, Left is set to zero, Bottom is set to the condensed page height, and Right is set to the condensed page width. After the bottom shading has been drawn, the brush is deleted (step S85-8).

Figure 25:
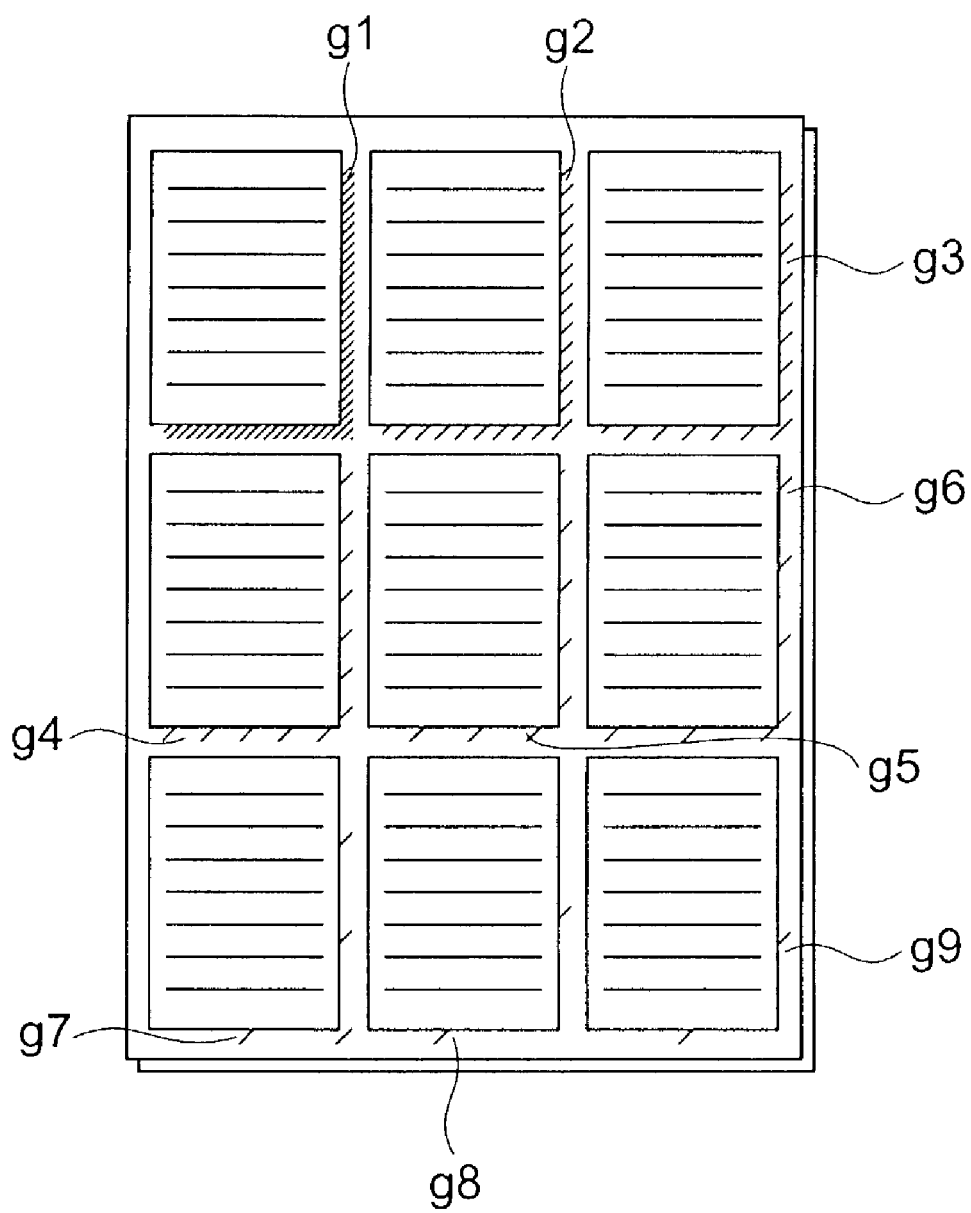
FIG. 25 illustrates condensed pages and overlaid sequence information printed in the fifth embodiment.

FIG. 25 shows a sheet on which nine condensed pages are printed according to the fifth embodiment, using a left-to-right row layout. From shading g1 to g9, the shading becomes gradually less dense. A reader of the condensed document can immediately recognize the page sequence from the decreasing shading density, without having to hunt for page numbers or determine the page sequence from the content of the pages.

Shading is conventionally used in condensed printing to make the individual condensed pages stand out. By varying the shading density so as to indicate the page sequence, the fifth embodiment is able to indicate the page sequence without the need to overlay numbers or symbols on the condensed pages.

In a variation of the fifth embodiment, the shading is printed in color, and the page layout sequence is indicated by varying the shading color, proceeding from lighter colors to darker colors, for example.

The present invention is not limited to the methods of indicating page sequence appearing in the embodiments above. Instead of sequence numbers, sequence symbols, borders, or shading, any type of information that enables the reader to recognize the page sequence may be overlaid on the condensed page image data. The scope of the invention should accordingly be determined from the appended claims.

What is claimed is:

1. A data processing apparatus for generating image data for printing a plurality of pages of a document on a single sheet of a printing medium, comprising:
    an image data generator for condensing image data of each page among the plurality of pages by a prescribed reduction ratio;
    a sequence information overlayer for overlaying layout sequence information indicating the layout sequence of the pages on the condensed image data of the pages, the layout sequence information including page borders of different densities, the densities indicating the layout sequence of the pages; and
    an output device for combining the condensed image data of the pages and the overlaid layout sequence information into image data for the single sheet such that the condensed image data of the pages appears in prescribed positions on the single sheet, and outputting the image data.

2. The data processing apparatus of claim 1, wherein the page borders successively decrease in density from a first page in the layout sequence to a last page in the layout sequence.

3. A data processing apparatus for generating image data for printing a plurality of pages of a document on a single sheet of a printing medium, comprising:
    an image data generator for condensing image data of each page among the plurality of pages by a prescribed reduction ratio;
    a sequence information overlayer for overlaying layout sequence information indicating the layout sequence of the pages on the condensed image data of the pages, the layout sequence information including page borders of different colors, the colors indicating the layout sequence of the pages; and
    an output device for combining the condensed image data of the pages and the overlaid layout sequence information into image data for the single sheet, such that the condensed image data of the pages appears in prescribed positions on the single sheet, and outputting the image data.

4. A data processing apparatus for generating image data for printing a plurality of pages of a document on a single sheet of a printing medium, comprising:
    an image data generator for condensing image data of each page among the plurality of pages by a prescribed reduction ratio;
    a sequence information overlayer for overlaying layout sequence information indicating the layout sequence of the pages on the condensed image data of the pages, the layout sequence information including shading of different densities, the densities indicating the sequence of the pages; and
    an output device for combining the condensed image data of the pages and the overlaid layout sequence information into image data for the single sheet, such that the condensed image data of the pages appears in prescribed positions on the single sheet, and outputting the image data.

5. The data processing apparatus of claim 4, wherein the shading is disposed at two mutually adjacent edges of each page printed on said single sheet, and the shading decreases in density from a first page in the layout sequence to a last page in the layout sequence.

6. A data processing apparatus for generating image data for printing a plurality of pages of a document on a single sheet of a printing medium, comprising:
    an image data generator for condensing image data of each page among the plurality of pages by a prescribed reduction ratio;
    a sequence information overlayer for overlaying layout sequence information indicating the layout sequence of the pages on the condensed image data of the pages, the layout sequence information including shading of different colors, the colors indicating the sequence of the pages; and
    an output device for combining the condensed image data of the pages and the overlaid layout sequence information into image data for the single sheet, such that the condensed image data of the pages appears in prescribed positions on the single sheet, and outputting the image data.

7. A data processing apparatus for generating image data for printing a plurality of condensed pages of a document on a single sheet of a printing medium, comprising:
a sample image forming unit that creates sample images representing the condensed pages, the sample images being condensed by certain ratios;
a layout determining unit that determines a layout of the condensed pages and generating sequence information indicating a layout sequence of the condensed pages; and
a sample image display unit that displays the sample images representing the condensed pages according to said layout, and drawing a sequence line on the sample images, the sequence line starting in a sample image of a first condensed page in the layout sequence and ending in a sample image of a last condensed page in the layout sequence.

8. The data processing apparatus of claim 7, wherein the sample image display unit also draws a dot marking the start of the sequence line and a triangle marking the end of the sequence line.

9. The data processing apparatus of claim 7, wherein:
if the layout sequence is a row sequence, the sequence line extends across a top row of sample images of the condensed pages, then extends diagonally down to a bottom row of sample images of the condensed pages, then extends across the bottom row of sample images of the condensed pages; and
if the layout sequence is a column sequence, the sequence line extends down a first column of sample images of the condensed pages, then extends diagonally over to a last column of sample images of the condensed pages, then extends down the last column of sample images of the condensed pages.

10. The data processing apparatus of claim 7, wherein the sample image display unit also draws sequence numbers in the sample images of the condensed pages.

11. A method of indicating the sequence of a plurality of condensed pages, comprising:
overlaying sequence information indicating the sequence of the condensed pages on image data of the condensed pages, the sequence information including page borders of different densities, the densities indicating the sequence of the condensed pages; and
outputting image data combining the image data of the condensed pages and the overlaid sequence information for printing on a single sheet of printing media.

12. The method of claim 11, wherein the page borders successively decrease in density from a first condensed page in said sequence to a last condensed page in said sequence.

13. A method of indicating the sequence of a plurality of condensed pages, comprising:
overlaying sequence information indicating the sequence of the condensed pages on image data of the condensed pages, the sequence information including page borders of different colors, the colors indicating the sequence of the condensed pages; and
outputting image data combining the image data of the condensed pages and the overlaid sequence information for printing on a single sheet of printing media.

14. A method of indicating the sequence of a plurality of condensed pages, comprising:
overlaying sequence information indicating the sequence of the condensed pages on image data of the condensed pages, the sequence information including shading of different densities, the densities indicating the sequence of the condensed pages; and
outputting image data combining the image data of the condensed pages and the overlaid sequence information for printing on a single sheet of printing media.

15. The method of claim 14, wherein the shading is disposed at two mutually adjacent edges of each condensed page printed on said single sheet, and the shading decreases in density from a first condensed page in said sequence to a last condensed page in said sequence.

16. A method of indicating the sequence of a plurality of condensed pages, comprising:
overlaying sequence information indicating the sequence of the condensed pages on image data of the condensed pages, the sequence information including shading of different colors, the colors indicating the sequence of the condensed pages; and
outputting image data combining the image data of the condensed pages and the overlaid sequence information for printing on a single sheet of printing media.

17. A method of indicating the sequence of a plurality of condensed pages to be printed on a single sheet of printing media, comprising:
forming sample images representing the condensed pages, the sample images being condensed by certain ratios;
determining a layout of the condensed pages;
generating sequence information indicating a layout sequence of the condensed pages;
displaying the sample images representing the condensed pages according to said layout; and
displaying the sequence information indicating the sequence of the condensed pages by drawing a sequence line on the sample images as said sequence information, the sequence line starting in a sample image of a first condensed page in the layout sequence and ending in a sample image of a last condensed page in the layout sequence.

18. The method of claim 17, wherein displaying the sequence information further comprises drawing a dot marking the start of the sequence line and a triangle marking the end of the sequence line.

19. The method of claim 17, wherein:
if the layout sequence is a row sequence, the sequence line extends across a top row of sample images of the condensed pages, then extends diagonally down to a bottom row of sample images of the condensed pages, then extends across the bottom row of sample images of the condensed pages; and
if the layout sequence is a column sequence, the sequence line extends down a first column of sample images of the condensed pages, then extends diagonally over to a last column of sample images of the condensed pages, then extends down the last column of sample images of the condensed pages.

20. The method of claim 17, wherein displaying the sequence information further comprises drawing sequence numbers in the sample images of the condensed pages.

* * * * *